United States Patent
Canavor et al.

(10) Patent No.: US 11,444,936 B2
(45) Date of Patent: Sep. 13, 2022

(54) MANAGING SECURITY CREDENTIALS

(71) Applicant: Amazon Technologies, Inc., Seattle, WA (US)

(72) Inventors: Darren Ernest Canavor, Redmond, WA (US); Jesper Mikael Johannson, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 480 days.

(21) Appl. No.: 16/441,628

(22) Filed: Jun. 14, 2019

(65) Prior Publication Data
US 2019/0297071 A1    Sep. 26, 2019

Related U.S. Application Data

(63) Continuation of application No. 15/679,205, filed on Aug. 17, 2017, now Pat. No. 10,362,019, which is a continuation-in-part of application No. 14/630,219, filed on Feb. 24, 2015, now abandoned, which is a continuation-in-part of application No. 13/194,287, filed on Jul. 29, 2011, now Pat. No. 9,767,262.

(51) Int. Cl.
*H04L 9/40*    (2022.01)

(52) U.S. Cl.
CPC ........... *H04L 63/083* (2013.01); *H04L 63/08* (2013.01)

(58) Field of Classification Search
CPC . H04L 63/08; H04L 63/0815; H04L 63/0823; H04L 63/083; H04L 63/0853; H04L 67/306; G06F 21/31
See application file for complete search history.

(56) References Cited

U.S. PATENT DOCUMENTS

| | | | |
|---|---|---|---|
| 5,199,590 A | 4/1993 | Grandahl et al. | |
| 5,991,882 A | 11/1999 | Foley | |
| 6,006,333 A | 12/1999 | Nielsen | |
| 6,097,259 A | 8/2000 | Saito et al. | |
| 6,115,643 A | 9/2000 | Stine et al. | |

(Continued)

FOREIGN PATENT DOCUMENTS

| | | |
|---|---|---|
| CN | 101286847 | 10/2008 |
| CN | 101563885 | 10/2009 |

(Continued)

OTHER PUBLICATIONS

U.S. Appl. No. 16/521,164, filed Jul. 24, 2019, Non-Final Office Action dated Jan. 10, 2020.

(Continued)

*Primary Examiner* — Kevin Bechtel
(74) *Attorney, Agent, or Firm* — Thomas | Horstemeyer, LLP

(57) ABSTRACT

Disclosed are various embodiments for managing security credentials. In one embodiment, knowledge-based questions are selected in response to failing to receive a valid master security credential in a request to authenticate a user account for access to account data. In response to receiving the request, the plurality of knowledge-based questions are provided to an application. Answers to the knowledge-based questions are received and scored. Access is granted to establish a new master security credential based at least in part on the score meeting or exceeding a predetermined threshold.

20 Claims, 8 Drawing Sheets

(56) References Cited

U.S. PATENT DOCUMENTS

| | | | |
|---|---|---|---|
| 6,144,988 A | 11/2000 | Kappel | |
| 6,182,131 B1 | 1/2001 | Dean et al. | |
| 6,182,229 B1 | 1/2001 | Nielsen | |
| 6,453,342 B1 | 9/2002 | Himmel et al. | |
| 6,607,322 B2 | 8/2003 | Aruga et al. | |
| 6,745,711 B1 | 6/2004 | Martelli | |
| 6,751,794 B1 | 6/2004 | McCaleb et al. | |
| 7,084,968 B2 | 8/2006 | Shibuya et al. | |
| 7,155,739 B2 | 12/2006 | Bari et al. | |
| 7,177,848 B2 | 2/2007 | Hogan et al. | |
| 7,185,364 B2 | 2/2007 | Knouse et al. | |
| 7,373,515 B2 | 5/2008 | Owen et al. | |
| 7,428,750 B1 | 9/2008 | Dunn et al. | |
| 7,441,263 B1 | 10/2008 | Bakshi et al. | |
| 7,451,476 B1 | 11/2008 | Banks et al. | |
| 7,512,875 B2 | 3/2009 | Davis | |
| 7,607,164 B2 | 10/2009 | Vasishth et al. | |
| 7,630,986 B1 | 12/2009 | Herz et al. | |
| 7,631,346 B2 | 12/2009 | Hinton et al. | |
| 7,634,811 B1 | 12/2009 | Kienzle et al. | |
| 7,660,902 B2 | 2/2010 | Graham et al. | |
| 7,673,045 B1 | 3/2010 | Battle et al. | |
| 7,685,298 B2 | 3/2010 | Day et al. | |
| 7,698,170 B1 | 4/2010 | Darr et al. | |
| 7,720,720 B1 | 5/2010 | Sharma et al. | |
| 7,793,343 B2 | 9/2010 | Timmerman | |
| 8,051,168 B1 | 11/2011 | Boysko et al. | |
| 8,055,055 B2 | 11/2011 | Hamada et al. | |
| 8,087,068 B1 | 12/2011 | Downey et al. | |
| 8,151,328 B1 | 4/2012 | Lundy et al. | |
| 8,166,161 B1 | 4/2012 | Gannu et al. | |
| 8,200,975 B2 | 6/2012 | O'Connor et al. | |
| 8,201,217 B1 | 6/2012 | Begen et al. | |
| 8,209,549 B1 | 6/2012 | Bain, III | |
| 8,245,026 B1 | 8/2012 | Moore | |
| 8,276,190 B1 | 9/2012 | Chang et al. | |
| 8,327,428 B2 | 12/2012 | Bailey et al. | |
| 8,423,467 B1 | 4/2013 | Johansson et al. | |
| 8,453,198 B2 | 5/2013 | Band et al. | |
| 8,468,577 B1 | 6/2013 | Pooley et al. | |
| 8,510,811 B2 | 8/2013 | Kuang et al. | |
| 8,544,072 B1 | 9/2013 | Mason et al. | |
| 8,549,597 B1 | 10/2013 | Strand | |
| 8,595,269 B2 | 11/2013 | Farcasiu et al. | |
| 8,607,322 B2 | 12/2013 | Hinton et al. | |
| 8,700,729 B2 | 4/2014 | Dua | |
| 8,713,129 B2 | 4/2014 | Schneider | |
| 8,721,738 B1 | 5/2014 | Miller | |
| 8,745,698 B1* | 6/2014 | Ashfield | G06Q 40/02 726/4 |
| 8,745,705 B2 | 6/2014 | Hitchcock et al. | |
| 8,745,711 B2 | 6/2014 | Matsuda | |
| 8,751,794 B2 | 6/2014 | Haulund | |
| 8,762,512 B1 | 6/2014 | Sundaram et al. | |
| 8,769,305 B2 | 7/2014 | Blaisdell | |
| 8,776,194 B2 | 7/2014 | Hitchcock et al. | |
| 8,776,214 B1 | 7/2014 | Johansson | |
| 8,789,135 B1 | 7/2014 | Pani | |
| 8,812,666 B2 | 8/2014 | Kikinis | |
| 8,819,795 B2 | 8/2014 | Hitchcock et al. | |
| 8,819,810 B1 | 8/2014 | Liu | |
| 8,819,851 B1 | 8/2014 | Johansson | |
| 8,843,997 B1 | 9/2014 | Hare | |
| 8,844,013 B2 | 9/2014 | Vangpat et al. | |
| 8,863,250 B2 | 10/2014 | Hitchcock et al. | |
| 8,918,848 B2 | 12/2014 | Sharma et al. | |
| 8,955,065 B2 | 2/2015 | Hitchcock et al. | |
| 9,053,307 B1 | 6/2015 | Johansson et al. | |
| 9,055,055 B1 | 6/2015 | Strand et al. | |
| 9,106,645 B1 | 8/2015 | Vadlamani | |
| 9,124,431 B2* | 9/2015 | Schechter | G06F 40/247 |
| 9,225,704 B1 | 12/2015 | Johansson et al. | |
| 9,282,098 B1 | 3/2016 | Hitchcock et al. | |
| 9,330,198 B2 | 5/2016 | Campbell et al. | |
| 9,350,733 B2 | 5/2016 | O'Sullivan et al. | |
| 9,369,460 B2 | 6/2016 | Johansson | |
| 9,374,369 B2 | 6/2016 | Mahaffey et al. | |
| 9,444,903 B2 | 9/2016 | Nuaimi et al. | |
| 9,450,941 B2 | 9/2016 | Hitchcock et al. | |
| 2002/0023059 A1 | 2/2002 | Bari et al. | |
| 2002/0031230 A1 | 3/2002 | Sweet et al. | |
| 2002/0049782 A1 | 4/2002 | Herzenberg et al. | |
| 2002/0083012 A1 | 6/2002 | Bush et al. | |
| 2002/0093915 A1 | 7/2002 | Larson | |
| 2002/0108057 A1 | 8/2002 | Zhanhong et al. | |
| 2002/0120757 A1 | 8/2002 | Sutherland et al. | |
| 2002/0156757 A1 | 10/2002 | Brown | |
| 2002/0178370 A1 | 11/2002 | Gurevich et al. | |
| 2002/0191020 A1 | 12/2002 | Kaply et al. | |
| 2003/0005299 A1 | 1/2003 | Xia et al. | |
| 2003/0074580 A1 | 4/2003 | Knouse et al. | |
| 2003/0135482 A1 | 7/2003 | Takahashi et al. | |
| 2004/0036718 A1 | 2/2004 | Warren et al. | |
| 2004/0119746 A1 | 6/2004 | Mizrah | |
| 2005/0027713 A1 | 2/2005 | Cameron et al. | |
| 2005/0132203 A1 | 6/2005 | Dharmarajan | |
| 2005/0149854 A1 | 7/2005 | Pennell et al. | |
| 2005/0177731 A1 | 8/2005 | Torres et al. | |
| 2005/0183003 A1 | 8/2005 | Peri | |
| 2005/0188212 A1 | 8/2005 | Laferriere et al. | |
| 2005/0210254 A1 | 9/2005 | Gabryjelski et al. | |
| 2005/0216768 A1 | 9/2005 | Eppert | |
| 2005/0228899 A1 | 10/2005 | Wendkos et al. | |
| 2006/0059434 A1 | 3/2006 | Boss et al. | |
| 2006/0089837 A1 | 4/2006 | Adar et al. | |
| 2006/0123472 A1 | 6/2006 | Schmidt et al. | |
| 2006/0136985 A1 | 6/2006 | Ashley et al. | |
| 2006/0165060 A1 | 7/2006 | Dua | |
| 2006/0200424 A1 | 9/2006 | Cameron et al. | |
| 2007/0003144 A1 | 1/2007 | Landstad et al. | |
| 2007/0005964 A1 | 1/2007 | Grosse et al. | |
| 2007/0023441 A1 | 2/2007 | Huffman et al. | |
| 2007/0027715 A1 | 2/2007 | Gropper et al. | |
| 2007/0044143 A1 | 2/2007 | Zhu et al. | |
| 2007/0078785 A1 | 4/2007 | Bush et al. | |
| 2007/0118394 A1 | 5/2007 | Cahoon | |
| 2007/0130327 A1 | 6/2007 | Kuo et al. | |
| 2007/0143827 A1 | 6/2007 | Nicodemus et al. | |
| 2007/0234062 A1 | 10/2007 | Friedline | |
| 2007/0234410 A1 | 10/2007 | Geller | |
| 2007/0240226 A1 | 10/2007 | Song et al. | |
| 2007/0250920 A1 | 10/2007 | Lindsay | |
| 2008/0002844 A1 | 1/2008 | Chin | |
| 2008/0003144 A1 | 1/2008 | Cumberland | |
| 2008/0028444 A1 | 1/2008 | Loesch et al. | |
| 2008/0031447 A1 | 2/2008 | Geshwind et al. | |
| 2008/0040790 A1 | 2/2008 | Kuo | |
| 2008/0052203 A1 | 2/2008 | Beyer et al. | |
| 2008/0071808 A1 | 3/2008 | Hardt et al. | |
| 2008/0120703 A1 | 5/2008 | Morris et al. | |
| 2008/0120716 A1 | 5/2008 | Hall et al. | |
| 2008/0134317 A1* | 6/2008 | Boss | G06F 21/31 726/18 |
| 2008/0141037 A1 | 6/2008 | Cheston et al. | |
| 2008/0146194 A1 | 6/2008 | Yang et al. | |
| 2008/0167970 A1 | 7/2008 | Nissim | |
| 2008/0168539 A1 | 7/2008 | Stein | |
| 2008/0201454 A1 | 8/2008 | Soffer | |
| 2008/0201575 A1 | 8/2008 | Van | |
| 2008/0201768 A1 | 8/2008 | Koo et al. | |
| 2008/0256594 A1 | 10/2008 | Satish et al. | |
| 2008/0263352 A1 | 10/2008 | Krahn et al. | |
| 2009/0042540 A1 | 2/2009 | Bodnar et al. | |
| 2009/0070412 A1 | 3/2009 | D Angelo et al. | |
| 2009/0089883 A1 | 4/2009 | Martocci | |
| 2009/0144546 A1 | 6/2009 | Jancula et al. | |
| 2009/0150169 A1 | 6/2009 | Kirkwood et al. | |
| 2009/0158406 A1 | 6/2009 | Jancula et al. | |
| 2009/0240936 A1 | 9/2009 | Lambiase et al. | |
| 2009/0259588 A1 | 10/2009 | Lindsay | |
| 2009/0265770 A1 | 10/2009 | Basson et al. | |
| 2009/0276839 A1 | 11/2009 | Peneder | |
| 2009/0300196 A1 | 12/2009 | Haghpassand | |
| 2010/0017616 A1 | 1/2010 | Nichols et al. | |

(56) References Cited

U.S. PATENT DOCUMENTS

| | | | |
|---|---|---|---|
| 2010/0024023 A1* | 1/2010 | Bair | H04L 9/3231 726/8 |
| 2010/0037046 A1 | 2/2010 | Ferg et al. | |
| 2010/0037303 A1 | 2/2010 | Sharif et al. | |
| 2010/0071056 A1 | 3/2010 | Cheng et al. | |
| 2010/0100721 A1 | 4/2010 | Su et al. | |
| 2010/0100952 A1 | 4/2010 | Sample et al. | |
| 2010/0106533 A1 | 4/2010 | Alvarez | |
| 2010/0146609 A1 | 6/2010 | Bartlett | |
| 2010/0154025 A1 | 6/2010 | Esteve et al. | |
| 2010/0161965 A1 | 6/2010 | Solin et al. | |
| 2010/0162373 A1 | 6/2010 | Springfield et al. | |
| 2010/0178944 A1 | 7/2010 | Fodor | |
| 2010/0178994 A1 | 7/2010 | Tenger et al. | |
| 2010/0198698 A1 | 8/2010 | Raleigh et al. | |
| 2010/0211796 A1 | 8/2010 | Gailey et al. | |
| 2010/0217975 A1 | 8/2010 | Grajek et al. | |
| 2010/0217997 A1 | 8/2010 | Chai et al. | |
| 2010/0250330 A1 | 9/2010 | Lam et al. | |
| 2010/0275024 A1 | 10/2010 | Noh | |
| 2010/0313245 A1 | 12/2010 | Brandt et al. | |
| 2011/0016515 A1 | 1/2011 | Dhanakshirur et al. | |
| 2011/0055593 A1 | 3/2011 | Lurey et al. | |
| 2011/0113245 A1 | 5/2011 | Varadarajan | |
| 2011/0145049 A1 | 6/2011 | Hertel et al. | |
| 2011/0145915 A1 | 6/2011 | Gnech et al. | |
| 2011/0162052 A1 | 6/2011 | Hayward | |
| 2011/0231651 A1 | 9/2011 | Bollay | |
| 2011/0265147 A1 | 10/2011 | Liu | |
| 2011/0277027 A1 | 11/2011 | Hayton et al. | |
| 2012/0011577 A1 | 1/2012 | Mashimo | |
| 2012/0036245 A1 | 2/2012 | Dare et al. | |
| 2012/0054095 A1 | 3/2012 | Lesandro et al. | |
| 2012/0072975 A1 | 3/2012 | Labrador et al. | |
| 2012/0084844 A1 | 4/2012 | Brown et al. | |
| 2012/0144452 A1 | 6/2012 | Dyor et al. | |
| 2012/0150888 A1 | 6/2012 | Hyatt et al. | |
| 2012/0158526 A1 | 6/2012 | Cosman | |
| 2012/0182865 A1 | 7/2012 | Andersen et al. | |
| 2012/0192256 A1 | 7/2012 | Peterson et al. | |
| 2012/0210443 A1 | 8/2012 | Blaisdell et al. | |
| 2012/0216260 A1 | 8/2012 | Crawford et al. | |
| 2012/0227094 A1* | 9/2012 | Begen | H04L 63/0815 726/4 |
| 2012/0291087 A1 | 11/2012 | Agrawal | |
| 2013/0007868 A1 | 1/2013 | Hoggan et al. | |
| 2013/0023818 A1 | 1/2013 | Rosenblum et al. | |
| 2013/0086657 A1 | 4/2013 | Srinivasan et al. | |
| 2013/0111543 A1 | 5/2013 | Brown et al. | |
| 2013/0167196 A1 | 6/2013 | Spencer et al. | |
| 2013/0198818 A1 | 8/2013 | Hitchcock et al. | |
| 2013/0198821 A1 | 8/2013 | Hitchcock et al. | |
| 2013/0198822 A1 | 8/2013 | Hitchcock et al. | |
| 2013/0198823 A1 | 8/2013 | Hitchcock et al. | |
| 2013/0198824 A1 | 8/2013 | Hitchcock et al. | |
| 2013/0200999 A1 | 8/2013 | Spodak et al. | |
| 2013/0205415 A1 | 8/2013 | Roark et al. | |
| 2013/0247144 A1 | 9/2013 | Marshall et al. | |
| 2013/0247147 A1 | 9/2013 | Pontillo et al. | |
| 2013/0282698 A1* | 10/2013 | Oztekin | G06F 16/248 707/722 |
| 2013/0283193 A1 | 10/2013 | Griffin | |
| 2013/0304616 A1 | 11/2013 | Raleigh et al. | |
| 2013/0318593 A1 | 11/2013 | Smith et al. | |
| 2013/0347078 A1 | 12/2013 | Agarwal et al. | |
| 2014/0089661 A1 | 3/2014 | Mahadik et al. | |
| 2014/0101437 A1 | 4/2014 | Kube et al. | |
| 2014/0189808 A1 | 7/2014 | Mahaffey et al. | |
| 2014/0223175 A1 | 8/2014 | Bhatnagar | |
| 2014/0259130 A1 | 9/2014 | Li et al. | |
| 2014/0310792 A1 | 10/2014 | Hyland et al. | |
| 2014/0325623 A1 | 10/2014 | Johansson | |
| 2015/0033302 A1 | 1/2015 | Hitchcock et al. | |
| 2015/0180852 A1 | 6/2015 | Hitchcock et al. | |
| 2015/0244714 A1 | 8/2015 | Kundu et al. | |
| 2015/0261945 A1 | 9/2015 | Johansson et al. | |
| 2016/0164863 A1 | 6/2016 | Hitchcock et al. | |
| 2016/0224530 A1 | 8/2016 | Campbell et al. | |
| 2016/0285856 A1 | 9/2016 | Johansson | |
| 2016/0294837 A1 | 10/2016 | Turgeman | |
| 2016/0359841 A1 | 12/2016 | Hitchcock et al. | |

FOREIGN PATENT DOCUMENTS

| | | |
|---|---|---|
| CN | 102624570 | 8/2012 |
| CN | 104144172 | 11/2014 |
| JP | H09179826 | 7/1997 |
| JP | 2000347994 | 12/2000 |
| JP | 2002157226 | 5/2002 |
| JP | 2002169782 | 6/2002 |
| JP | 2005502931 | 1/2005 |
| JP | 2005346570 | 12/2005 |
| JP | 2007156698 | 6/2007 |
| JP | 2008197973 | 8/2008 |
| JP | 2008282388 | 11/2008 |
| JP | 2008287701 | 11/2008 |
| JP | 2009532772 | 9/2009 |
| JP | 2010224022 | 10/2010 |
| JP | 2011505735 | 2/2011 |
| WO | 2011100331 | 8/2011 |
| WO | 2013116319 | 8/2013 |
| WO | 2013170374 | 11/2013 |

OTHER PUBLICATIONS

U.S. Appl. No. 15/097,704, filed Apr. 13, 2016, Final Office Action dated Oct. 6, 2017.

U.S. Appl. No. 15/097,704, filed Apr. 13, 2016, Non-Final Office Action dated Mar. 24, 2017.

U.S. Appl. No. 15/097,704, filed Apr. 13, 2016, Response to Non-Final Office Action dated Mar. 24, 2017.

U.S. Appl. No. 15/172,750, filed Jun. 3, 2016, Final Office Action dated Nov. 23, 2018.

U.S. Appl. No. 15/172,750, filed Jun. 3, 2016, Non-Final Office Action dated May 3, 2018.

U.S. Appl. No. 15/172,750, filed Jun. 3, 2016, Notice of Patent Decision mailed on Mar. 19, 2019.

U.S. Appl. No. 15/239,475, filed Aug. 17, 2016, Notice of Allowance dated Feb. 2, 2017.

U.S. Appl. No. 15/445,054, filed Feb. 28, 2017, Final Office Action dated May 31, 2018.

U.S. Appl. No. 15/445,054, filed Feb. 28, 2017, Non-Final Office Action dated Oct. 20, 2017.

U.S. Appl. No. 15/445,054, filed Feb. 28, 2017, Response to Non-Final Office Action dated Oct. 20, 2017.

U.S. Appl. No. 15/628,303, filed Jun. 20, 2017, Non-Final Office Action dated Mar. 21, 2019.

U.S. Appl. No. 15/679,205, filed Aug. 17, 2017, Non-Final Office Action dated Nov. 20, 2018.

U.S. Appl. No. 15/679,205, filed Aug. 17, 2017, Notice of Allowance dated Mar. 14, 2019.

U.S. Appl. No. 12/539,886 entitled "Authentication Manager", filed Aug. 12, 2009.

Watt, John; Sinnott, Richard O.; Inman, George; Chadwick, David. Federated Authentication and Authorisation in the Social Science Domain. 2011 Sixth International Conference on Availability, Reliability and Security (ARES). Relevant pp. 541-548. http://ieeexplore.ieee.org/stamp/stamp.jsp?tp=&arnumber=6045974&tag=1.

Wikipedia article for "Password manager" Originally published Jul. 31, 2008 (2 pages) http://en.wikipedia.org/w/index.php?title=Password.sub.-manager&oldid=22- 9103460.

U.S. Appl. No. 15/445,054, filed Feb. 28, 2017, Notice of Allowance dated Sep. 27, 2019.

U.S. Appl. No. 15/628,303, filed Jun. 20, 2017, Notice of Allowance dated Jul. 30, 2019.

U.S. Appl. No. 13/194,287, filed Jul. 29, 2011, Response to Non-Final Office Action dated Jul. 3, 2013.

U.S. Appl. No. 13/194,287, filed Jul. 29, 2011, Response to Non-Final Office Action dated Dec. 5, 2012.

(56) References Cited

OTHER PUBLICATIONS

U.S. Appl. No. 13/363,654, filed Feb. 1, 2012, Notice of Allowance dated Dec. 13, 2013.
U.S. Appl. No. 13/363,664, filed Feb. 1, 2012, Final Office Action dated Nov. 26, 2013.
U.S. Appl. No. 13/363,664, filed Feb. 1, 2012, Notice of Allowance dated Mar. 17, 2014.
U.S. Appl. No. 13/363,664, filed Feb. 1, 2012, Response to Final Office Action dated Nov. 26, 2013.
U.S. Appl. No. 13/363,664, filed Feb. 1, 2012, Response to Non-Final Office Action dated May 9, 2013.
U.S. Appl. No. 13/363,664 filed on 02101/2012, Final Office Action dated Nov. 26, 2013.
U.S. Appl. No. 13/363,664 filed on 02101/2012, Response to Final Office Action dated Nov. 26, 2013.
U.S. Appl. No. 13/363,675, filed Feb. 1, 2012, Non-Final Office Action dated May 9, 2013.
U.S. Appl. No. 13/363,675, filed Feb. 1, 2012, Notice of Allowance dated Jun. 13, 2014.
U.S. Appl. No. 13/363,675, filed Feb. 1, 2012, Response to Final Office Action dated Oct. 9, 2013.
U.S. Appl. No. 13/363,675, filed Feb. 1, 2012, Response to Non-Final Office Action dated May 9, 2013.
U.S. Appl. No. 13/363,675 filed on 02101/2012, Final Office Action dated Oct. 9, 2013.
U.S. Appl. No. 13/363,681, filed Feb. 1, 2012, Advisory Action dated Feb. 28, 2014.
U.S. Appl. No. 13/363,681, filed Feb. 1, 2012, Response to Final Office Action dated Nov. 8, 2013.
U.S. Appl. No. 13/363,681, filed Feb. 1, 2012, Response to Non-Final Office Action dated Apr. 15, 2013.
U.S. Appl. No. 13/363,681, filed Feb. 1, 2012, Response to Non-Final Office Action dated May 20, 2014.
U.S. Appl. No. 13/363,681 filed on 02101/2012, Final Office Action dated Nov. 8, 2013.
U.S. Appl. No. 13/363,681 filed on 02101/2012, Non-Final Office Action dated Apr. 15, 2013.
U.S. Appl. No. 13/363,681 filed on 02101/2012, Non-Final Office Action dated May 20, 2014.
U.S. Appl. No. 13/363,681 filed on 02101/2012, Notice of Allowance dated Oct. 1, 2014.
U.S. Appl. No. 13/363,685, filed Feb. 1, 2012, Non-Final Office Action dated Jan. 22, 2013.
U.S. Appl. No. 13/363,685, filed Feb. 1, 2012, Non-Final Office Action dated Feb. 3, 2014.
U.S. Appl. No. 13/363,685, filed Feb. 1, 2012, Non-Final Office Action dated Jul. 3, 2013.
U.S. Appl. No. 13/363,685, filed Feb. 1, 2012, Notice of Allowance dated Jun. 3, 2014.
U.S. Appl. No. 13/363,685, filed Feb. 1, 2012, Response to Non-Final Office Action dated Jan. 22, 2013.
U.S. Appl. No. 13/363,685, filed Feb. 1, 2012, Response to Non-Final Office Action dated Feb. 3, 2014.
U.S. Appl. No. 13/363,685, filed Feb. 1, 2012, Response to Non-Final Office Action dated Jul. 3, 2013.
U.S. Appl. No. 13/636,654, filed Feb. 1, 2012, Non-Final Office Action dated Apr. 1, 2013.
U.S. Appl. No. 13/636,654, filed Feb. 1, 2012, Response to Final Office Action dated Sep. 12, 2013.
U.S. Appl. No. 13/636,654, filed Feb. 1, 2012, Response to Non-Final Office Action dated Apr. 1, 2013.
U.S. Appl. No. 13/636,654 filed on 02101/2012, Final Office Action dated Sep. 12, 2013.
U.S. Appl. No. 13/679,254, filed Nov. 16, 2012, Final Office Action dated Jul. 17, 2015.
U.S. Appl. No. 13/679,254, filed Nov. 16, 2012, Non-Final Office Action dated May 23, 2014.
U.S. Appl. No. 13/679,254, filed Nov. 16, 2012, Non-Final Office Action dated Dec. 22, 2014.
U.S. Appl. No. 13/679,254, filed Nov. 16, 2012, Notice of Allowance dated Jan. 6, 2016.
U.S. Appl. No. 13/679,254, filed Nov. 16, 2012, Response to Final Office Action dated Jul. 17, 2015.
U.S. Appl. No. 13/679,254, filed Nov. 16, 2012, Response to Non-Final Office Action dated May 23, 2014.
U.S. Appl. No. 13/679,254, filed Nov. 16, 2012, Response to Non-Final Office Action dated Dec. 22, 2014.
U.S. Appl. No. 13/792,678, filed Mar. 11, 2013, Non-Final Office Action dated Jun. 3, 2015.
U.S. Appl. No. 13/792,678, filed Mar. 11, 2013, Non-Final Office Action dated Nov. 6, 2014.
U.S. Appl. No. 13/792,678, filed Mar. 11, 2013, Notice of Allowance dated Nov. 9, 2015.
U.S. Appl. No. 13/792,678, filed Mar. 11, 2013, Response to Non-Final Office Action dated Jun. 3, 2015.
U.S. Appl. No. 13/792,678, filed Mar. 11, 2013, Response to Non-Final Office Action dated Nov. 6, 2014.
U.S. Appl. No. 13/917,138, filed Jun. 13, 2013, Final Office Action dated Apr. 6, 2015.
U.S. Appl. No. 13/917,138, filed Jun. 13, 2013, Non-Final Office Action dated Dec. 18, 2014.
U.S. Appl. No. 13/917,138, filed Jun. 13, 2013, Notice of Allowance dated Nov. 30, 2015.
U.S. Appl. No. 13/917,138, filed Jun. 13, 2013, Response to Final Office Action dated Apr. 6, 2015.
U.S. Appl. No. 13/917,138, filed Jun. 13, 2013, Response to Non-Final Office Action dated Dec. 18, 2014.
U.S. Appl. No. 13/917,143, filed Jun. 13, 2013, Final Office Action dated May 27, 2015.
U.S. Appl. No. 13/917,143, filed Jun. 13, 2013, Final Office Action dated Jun. 3, 2016.
U.S. Appl. No. 13/917,143, filed Jun. 13, 2013, Non-Final Office Action dated Nov. 10, 2014.
U.S. Appl. No. 13/917,143, filed Jun. 13, 2013, Non-Final Office Action dated Nov. 19, 2015.
U.S. Appl. No. 13/917,143, filed Jun. 13, 2013, Notice of Allowance dated Nov. 9, 2016.
U.S. Appl. No. 13/917,143, filed Jun. 13, 2013, Patent Board of Appeals Decision mailed on Oct. 13, 2016.
U.S. Appl. No. 13/917,143, filed Jun. 13, 2013, Response to Final Office Action dated May 27, 2015.
U.S. Appl. No. 13/917,143, filed Jun. 13, 2013, Response to Non-Final Office Action dated Nov. 10, 2014.
U.S. Appl. No. 13/917,143, filed Jun. 13, 2013, Response to Non-Final Office Action dated Nov. 19, 2015.
U.S. Appl. No. 14/037,108, filed Sep. 25, 2013, Final Office Action dated Jul. 8, 2016.
U.S. Appl. No. 14/037,108, filed Sep. 25, 2013, Non-Final Office Action dated Feb. 1, 2016.
U.S. Appl. No. 14/037,108, filed Sep. 25, 2013, Non-Final Office Action dated Mar. 9, 2017.
U.S. Appl. No. 14/037,108, filed Sep. 25, 2013, Notice of Allowance dated Aug. 23, 2017.
U.S. Appl. No. 14/037,108, filed Sep. 25, 2013, Response to Final Office Action dated Jul. 8, 2016.
U.S. Appl. No. 14/037,108, filed Sep. 25, 2013, Response to Non-Final Office Action dated Feb. 1, 2016.
U.S. Appl. No. 14/037,108, filed Sep. 25, 2013, Response to Non-Final Office Action dated Mar. 9, 2017.
U.S. Appl. No. 14/093,143, filed Nov. 29, 2013, Advisory Action dated Mar. 16, 2016.
U.S. Appl. No. 14/093,143, filed Nov. 29, 2013, Examiners Answer to Appeal Brief mailed on Jan. 10, 2017.
U.S. Appl. No. 14/093,143, filed Nov. 29, 2013, Final Office Action dated Dec. 23, 2015.
U.S. Appl. No. 14/093,143, filed Nov. 29, 2013, Non-Final Office Action dated Jun. 30, 2015.
U.S. Appl. No. 14/093,143, filed Nov. 29, 2013, Non-Final Office Action dated Dec. 18, 2014.
U.S. Appl. No. 14/093,143, filed Nov. 29, 2013, Patent Board of Appeal Decision mailed on Jun. 21, 2016.

(56) References Cited

OTHER PUBLICATIONS

U.S. Appl. No. 14/093,143, filed Nov. 29, 2013, Response to Final Office Action dated Dec. 23, 2015.
U.S. Appl. No. 14/093,143, filed Nov. 29, 2013, Response to Non-Final Office Action dated Jun. 30, 2015.
U.S. Appl. No. 14/093,143, filed Nov. 29, 2013, Response to Non-Final Office Action dated Dec. 18, 2014.
U.S. Appl. No. 14/323,779, filed Jul. 3, 2014, Final Office Action dated Oct. 5, 2015.
U.S. Appl. No. 14/323,779, filed Jul. 3, 2014, Non-Final Office Action dated Mar. 4, 2015.
U.S. Appl. No. 14/323,779, filed Jul. 3, 2014, Notice of Allowance dated Feb. 17, 2016.
U.S. Patent Application 14/323,779, filed Jul. 3, 2014, Response to Final Office Action dated Oct. 5, 2015.
U.S. Patent Application 14/323,779, filed Jul. 3, 2014, Response to Non-Final Office Action dated Mar. 4, 2015.
U.S. Appl. No. 14/512,541, filed Oct. 13, 2014, Final Office Action dated Nov. 9, 2016.
U.S. Appl. No. 14/512,541, filed Oct. 13, 2014, Non-Final Office Action dated Aug. 4, 2016.
U.S. Appl. No. 14/512,541, filed Oct. 13, 2014, Notice of Allowance dated Feb. 23, 2017.
U.S. Appl. No. 14/512,541, filed Oct. 13, 2014, Response to Final Office Action dated Nov. 9, 2016.
U.S. Appl. No. 14/512,541, filed Oct. 13, 2014, Response to Non-Final Office Action dated Aug. 4, 2016.
U.S. Appl. No. 14/512,541, filed Oct. 13, 2014, Response to Restriction/Election dated May 19, 2016.
U.S. Appl. No. 14/512,541, filed Oct. 13, 2014, Restriction/Election dated May 19, 2016.
U.S. Appl. No. 14/615,931, filed Feb. 6, 2015, Final Office Action dated Dec. 11, 2015.
U.S. Appl. No. 14/615,931, filed Feb. 6, 2015, Non-Final Office Action dated Jul. 17, 2015.
U.S. Appl. No. 14/615,931, filed Feb. 6, 2015, Notice of Allowance dated May 20, 2016.
U.S. Appl. No. 14/615,931, filed Feb. 6, 2015, Response to Non-Final Office Action dated Jul. 17, 2015.
U.S. Appl. No. 14/615,931 filed on 02106/2015, Response to Final Office Action dated Dec. 11, 2015.
U.S. Appl. No. 14/630,219, filed Feb. 24, 2015, Examiner's Answer mailed on Oct. 13, 2016.
U.S. Appl. No. 14/630,219, filed Feb. 24, 2015, Final Office Action dated May 10, 2016.
U.S. Appl. No. 14/630,219, filed Feb. 24, 2015, Non-Final Office Action dated Jan. 25, 2016.
U.S. Appl. No. 14/630,219, filed Feb. 24, 2015, Patent Board of Appeals Decision mailed on Jul. 5, 2016.
U.S. Appl. No. 14/630,219, filed Feb. 24, 2015, Response to Non-Final Office Action dated Jan. 25, 2016.
U.S. Appl. No. 15/044,709 filed on 02116/2016, Non-Final Office Action dated Oct. 7, 2016.
U.S. Appl. No. 15/044,709 filed on 02116/2016, Notice of Allowance dated Oct. 7, 2016.
U.S. Appl. No. 15/044,709 filed on 02116/2016, Response to Non-Final Office Action dated Oct. 7, 2016.
Jammalamadaka, Ravi Chandra; van der Horst, Timothy W.; Mehrotra, Sharad; Seamons, Kent E.; Venkasubramanian Nalini. Delegate: A Proxy Based Architecture for Secure Web Access from an Untrusted Machine. 22nd Annual:; omputer Security Applications Conference, 2006. http://ieeexplore.ieee.org/stamp/stamp.jsp?arnumber=4041154.
Jana, Debasish; Bandyopadhyay, Debasis. Management of Identity and Credentials in Mobile Cloud Environment. 2013 International Conference on Advanced Computer Science and Information Systems (ICACSIS). http://ieeexplore.ieee.org/stamp/stamp.jsp?arnumber=6761561.
Japanese Office Action for JP 2014-555667 dated Apr. 19, 2016.
Japanese Office Action for JP 2014-555667 dated Sep. 8, 2015.
Japanese Patent Application JA 2016-180124 filed on Jan. 30, 2013, Office Action dated Oct. 12, 2017.
Japanese Patent Application JA 2016-180125 filed on Jan. 30, 2013, Office Action dated Oct. 27, 2017.
Japanese Patent Application JA 2016-180126 filed on Jan. 30, 2013, Office Action dated Oct. 18, 2017.
Japanese Patent Application JA 2016-180127 filed on Jan. 30, 2013, Office Action dated Oct. 13, 2017.
Japanese Patent Application JA 2016-180128 filed on Jan. 30, 2013, Notice of Allowance dated Sep. 12, 2017.
Japanese Patent Application JA 2016-180128 filed on Jan. 30, 2013, Notice of Patent mailed on Sep. 12, 2017.
Japanese Patent Application JA 2016-180128 filed on Jan. 30, 2013, Office Action dated Sep. 5, 2017.
Japanese Patent Application JP 2014-555667 filed on Jan. 30, 2013, Notice of Allowance dated Aug. 16, 2016.
Japanese Patent Application JP 2014-555667 filed on Jan. 30, 2013, Notice of Patent mailed on Sep. 23, 2016.
Japanese Patent Application JP 2016-180124 filed on Jan. 30, 2013, Office Action dated May 30, 2018.
Japanese Patent Application JP 2016-180125 filed on Sep. 15, 2016, Notice of Patent mailed on Jul. 11, 2018.
Japanese Patent Application JP 2016-180126 filed on Sep. 15, 2016, Notice of Reasons Rejection dated Jun. 5, 2018.
Japanese Patent Application JP 2016-180127 filed on Sep. 15, 2016, Notice of Patent mailed on Jul. 11, 2018.
Japanese Patent Application JP2016-180125 filed on Sep. 15, 2016, Determination of Allowance dated May 10, 2018.
Japanese Patent Application JP2016-180127 filed on Sep. 15, 2016, Determination of Allowance dated May 10, 2018.
KeePass Features—Nov. 9, 2008 http:/lweb.archive.org/web/20081109040244/htlp://keepass.info/features.ht-ml.
Kulvir Singh Bhogal. "Taking Firefox with You on the Road: Using a USB Thumb Drive" Published Jun. 2, 2006 (3 pages) http://www.informit.com/articles/printerfriendly.aspx?p=472692.
Macworld Mac OS X Hints—10.4: Create strong and memorable passwords—May 2, 2005 http://hints.macworld.com/article.php?story=20050323104042259.
Neuman, B. Clifford. Proxy-Based Authorization and Accounting for Distributed Systems. Proceedings, the 13th International Conference on Distributed Computing Systems. Pub. Date: 1993. Relevant pp. 283-291. http://eeexplore.ieee.org/stamp/stamp.jsp?tp=&amumber=287698.
Oppliger, Rolf; Rytz, Ruedi; Thomas Holderegger. Internet Banking: Client-Side Attacks and Protection Mechanisms. Computer, vol. 42, Issue: 6. Pub. Date: Aug. 2009. Relevant pp. 27-33. http://ieeexplore.ieee.org/stamp/stamp.isp?tp=&arnumber=5199590.
Password Keychain 1.0.1.37—Mar. 28, 2006 http://www.softpedia.com/get/Security/Password-Managers-Generators/Passwo-rd-Keychain.shtml.
PC Magazine—LastPass 1.50 Review & Rating—Mar. 20, 2009 http://www.pcmag.com/article2/0,2817,2343562,00 asp#fbid=rg3fbOOKZ4v.
RoboForm Reference Manual, 2007-2013, Siber Systems, Inc. (Year: 2007).
Sarah Perez. "Facebook Wins Worst API' in Developer Survey". TechCrunch. https://techcrunch.com/2011 /08/11 /facebookwins- worst-api-in-developer-survey/. Posted: Aug. 11, 2011. pp. 1-6.
Stack Overflow "why do we trust SSL certificates?" Various forum posts on Feb. 25, 2009 (4 pages) http://stackoverflow.com/questions/585129/why-do-we-trust-ssl-certificate- s.
Steve Gibson and Leo Laporte. "Security Now! Transcript of Episode #195: The SSL/TLS Protocol" Originally broadcast May 7, 2009 (22 pages) http://www.grc.com/sn/sn-195.pdf.
T. Dierks et al. "RFC 2246: The TLS Protocol Version 1.0" COPYRGT. 1999 The Internet Society. (80 pages) http://www.rfc-editor.org/rfc/pdfrfc/rfc2246.txt.pdf.
U.S. Appl. No. 12/539,886, filed Aug. 12, 2009, Advisory Action dated Apr. 18, 2013.
U.S. Appl. No. 12/539,886, filed Aug. 12, 2009, Final Office Action dated Dec. 31, 2012.

(56) References Cited

OTHER PUBLICATIONS

U.S. Appl. No. 12/539,886, filed Aug. 12, 2009, Non-Final Office Action dated Jun. 11, 2012.
U.S. Appl. No. 12/539,886, filed Aug. 12, 2009, Non-Final Office Action dated Jul. 19, 2013.
U.S. Appl. No. 12/539,886, filed Aug. 12, 2009, Notice of Allowance dated Feb. 24, 2014.
U.S. Appl. No. 12/539,886, filed Aug. 12, 2009, Response to Advisory Action dated Apr. 18, 2013.
U.S. Appl. No. 12/539,886, filed Aug. 12, 2009, Response to Final Office Action dated Dec. 31, 2012.
U.S. Appl. No. 12/539,886, filed Aug. 12, 2009, Response to Non-Final Office Action dated Jun. 11, 2012.
U.S. Appl. No. 12/539,886, filed Aug. 12, 2009, Response to Non-Final Office Action dated Jul. 19, 2013.
U.S. Appl. No. 13/194,287, filed Jul. 29, 2011, Final Office Action dated Jan. 27, 2014.
U.S. Appl. No. 13/194,287, filed Jul. 29, 2011, Final Office Action dated Oct. 20, 2016.
U.S. Appl. No. 13/194,287, filed Jul. 29, 2011, Non-Final Office Action dated Apr. 8, 2016.
U.S. Appl. No. 13/194,287, filed Jul. 29, 2011, Non-Final Office Action dated Jul. 3, 2013.
U.S. Appl. No. 13/194,287, filed Jul. 29, 2011, Non-Final Office Action dated Dec. 5, 2012.
U.S. Appl. No. 13/194,287, filed Jul. 29, 2011, Notice of Allowance dated May 18, 2017.
U.S. Appl. No. 13/194,287, filed Jul. 29, 2011, Response to Final Office Action dated Jan. 27, 2014.
U.S. Appl. No. 13/194,287, filed Jul. 29, 2011, Response to Final Office Action dated Oct. 20, 2016.
U.S. Appl. No. 13/194,287, filed Jul. 29, 2011, Response to Non-Final Office Action dated Apr. 8, 2016.
"CNN Member Center Register Free" .COPYRGT. 2005 Cable News Network LP, LLLP. (1 page) http://web.archive.org/web/20051108050554/http://audience.cnn.com/service-s/cnn/memberservices/member.sub.—register.jsp?pid=&source=cnn&url=http%3A- %2F%2Faudience.cnn.com%2Fservices%2Fcnn%2Fmemberservices%2Fregwall%2Fmembe- r.sub.—profile.jsp%3Fsource%3Dcnn.
"dria.org Blog archive: Firefox 3: Password management" Article published May 15, 2008 (4 pages) http://www.dria.org/wordpress/archives/2008/05/15/639/.
"KeePass Help Center: Password Generator" Article dated Jul. 30, 2008 as verified by the Internet Archive {4 pages) http://web.archive.org/web/20080730154305/http:i/keepass.info/help/base/p- wgenerator.html.
"KeePass Help Center: Security" Article dated Jul. 26, 2008 as verified by the Internet Archive (4 pages) http://web.archive.org/web/20080726082133/htlp://keepass.info/help/base/security.html.
"KeePass Help Center: Technical FAQ" Article dated Aug. 6, 2008 as verified by the Internet Archive (6 pages) http://web.archive.org/web/20080806090217/htlp://keepass.info/help/base/f-aq.sub.-tech.html.
"KeePass Help Center: Using Stored Passwords" Article dated May 16, 2008 as verified by the Internet Archive (1 page) http:/lweb.archive.org/web/20080516075550/http:/lwww.keepass.info/help/ba- se/usingpws.html.
"LastPass Form Fill Demonstration" YouTube video uploaded Sep. 25, 2008 (2 pages) http://www.youtube.com/watch?v=bxz6jA8zuPA&,feature=player.sub.-em- bedded.
"LastPass—Advanced Site Save and Autologin" YouTube video uploaded Jan. 6, 2009 (1 pages) http://www.youtube.com/watch?v=VCEBi25wadM.
"mozilla.org: Using Privacy Features".COPYRGT. 1999-2008 Mozilla.org (obtained by the Examiner on Apr. 28, 2008) (23 pages) http://www.mozilla.org/projects/security/pki/psm/help.sub.—21/using.sub.- —priv.sub.—help.html.
"MozillaZine: Security Error: Domain Name Mismatch or Server Certificate Expired" Article last modified Dec. 16, 2006 (observed by the Internet Archive on Jan. 10, 2007) (1 page) http://web.archive.org/web/20070110224337/http:l/kb.mozillazine.org/Secur- ity.sub.--Error"/o3A.sub.-Domain.sub.--Name.sub.-Mismatch.sub.-or.sub.--S- erver.sub.-:;ertificate.sub.—Expired.
"P-Synch Installation and Administration Guide" Last updated Jun. 1, 2000. COPYRIGHT. 2000 M-Tech Inc. (385 pages).
"RoboForm User Manual (Print Version)".COPYRGT. 2000-2007 Siber Systems. (33 pages) http://web.archive.org/web/20071014183247/http://www.roboform.com/manual-pr.pdf.
"RoboForm: Does RoboForm work in My Browser: AOL, MSN, Mozilla, Firefox, Netscape, Avant, MaxThon, NetCaptor, Slim, etc" Article dated Feb. 9, 2008 as verified by the Internet Archive (5 pages) http://web.archive.org/.web/20080209121716/http://www.roboform.com/browser- s.html#browser.sub.--mozilla.
"SSL Shopper: SSL Certificate Name Mismatch Error" Article posted Nov. 6, 2008 (observed by the Internet Archive on Dec. 10, 2008) (4 pages) http://web.archive.org/web/20081210144357/http://www.sslshopper.com/ssl-c- ertificate-name-mismatch-error.html, Dec. 1, 2017 Edit Delete.
"SuperGenPass: A Free Bookmarklet Password Generator Frequently Asked Questions" Article dated Jul. 16, 2008 as verified by the Internet Archive (7 pages) http://web.archive.org/web/20080716161432/http://supergenpass.com/about/.
"Yahoo! Mail Registration".COPYRGT. 2005 Yahoo! Inc. [web page dated Sep. 20, 2005 by the Internet Archive] (2 pages) http://web.archive.org/web/20050920102232/http://edit.yahoo.com/config/ev-al.sub.—register?.intl=US&new=1&.done=&.src=ym&.v=0&.u=4sji0q8tcall6&.par- tner=promo=&.last=.
"Yahoo! Sign-in and Registration Help: How do I change my password?" Dated Jan. 26, 2005 by the Internet Archive (1 page) http://web.archive.org/web/20050126025602/http://help.yahoo.eom/help/us/e-ditledit-13.html.
"Yahoo! Sign-in and Registration Help: How do I sign up?" Dated Jan. 26, 2005 by the Internet Archive (1 page) http://web.archive.org/web/20050126021347/http://help.yahoo.com/help/us/e- ditledit-01.html.
Adam Pash. "Five Best Password Managers" Published Aug. 28, 2008 at lifehacker.com (.COPYRIGHT. 2008 Gawker Media Inc.) (3 pages) http://lifehacker.com/5042616/live-best-password-managers.
Adam Pash. "LastPass Autocompletes Logins and Forms in Chrome, iPhone" Published Jan. 20, 2009 at lifehacker.com (.COPYRIGHT. 2009 Gawker Media Inc.) (2 pages) http://lifehacker.com/5135416/lastpass-autocompletes-logins-and-forms-in-chrome-iphone.
Bagheera et al. "Effect of changing minimum password length": ars technica openforum http://arstechnica.com/civis/viewtopic.php?f=17&t=353096; 31 posts published by Oct. 21, 2005.
Bin Mat Nor, Fazli; Abd Jalil, Kamarularifin; Ab Manan, Jamalullail. An Enhanced Remote Authentication Scheme to Mitigate Man-ln-The-Browser Attacks. 2012 International Conference on Cyber Security, CyberWarfare and Digital Forensic (CyberSec). http://ieeexplore.ieee.org/stamp/stamp.jsp?amumber=6246086.
Canadian Examination Search for CA 2,861,384 (PCT/US2013/023818) dated Apr. 9, 2015.
Canadian Patent Application CA 2,861,384 filed on Jan. 30, 2013, Notice of Allowance dated Apr. 13, 2017.
Canadian Patent Application CA 2,861,384 filed on Jan. 30, 2013, Notice of Patent mailed on Oct. 31, 2017.
Canadian Patent Application CA 2,861,384 filed on Jan. 30, 2013, Second Office Action dated May 5, 2016.
Canadian Patent Application CA 2,974,536 filed on Jan. 30, 2013, Notice of Allowance dated Oct. 20, 2017.
Canadian Patent Application CA 2,974,536 filed on Jan. 30, 2013, Notice of Patent mailed on Apr. 12, 2018.
Canfora, G.; DiSanto, G.; Venturi, G.; Zimeo, E.; Zito, MV. Proxy-based Hand-off of Web Sessions for User Mobility. The Second Annual Conference on MobiQuitous, 2005. Pub. Date: 2005. Relevant pp. 363-372. http://ieeexplore.eee.org/stamp/stamp.jsp?tp=&amumber=1541016.
Certificate, (n.d.) American Heritage® Dictionary of the English Language, Fifth Edition. (2011 ). Retrieved Sep. 29, 2016 from http://www.thefreedictionary.com/certificate.

(56) References Cited

OTHER PUBLICATIONS

Chad Perrin. "IT Security: Use the Firefox password manager" Published Aug. 4, 2009 by TechRepublic.com (4 pages) http://www.techrepublic.com/blog/security/use-the-firefox-password-manager/2089.
Chinese Office Action for 201380018421.0 dated Jan. 30, 2013.
Chinese Patent Application 201710968939.0 filed on Jan. 30, 2019, Notice of Allowance dated Jan. 22, 2019.
Chinese Patent Application CN 201710968939.0 filed on Jan. 30, 2013, 1st Office Action dated Aug. 14, 2018.
Chinese Patent Application CN 201710968939.0 filed on Jan. 30, 2013, Notice of Allowance dated Feb. 14, 2018.
Chinese Patent Application CN201380018421.0 filed on Jan. 30, 2013, First Office Action dated Jul. 19, 2016.
Chinese Patent Application CN201380018421.0 filed on Jan. 30, 2013, Notice of Allowance dated Aug. 3, 2017.
Chinese Patent Application CN201380018421.0 filed on Jan. 30, 2013, Notice of Patent mailed on Nov. 14, 2017.
Chinese Patent Application CN201380018421.0 filed on Jan. 30, 2013, Second Office Action dated Jan. 22, 2017.
Chinese Patent Application CN201380018421.0 filed on Jan. 30, 2013, Third Office Action dated May 24, 2017.
Diaz-Sanchez, Daniel; Almenarez, Florina; Marin, Andres; Arias, Patricia; Sanchez-Guerrero, Rosa; Sanvido, Fabio. A Privacy Aware Media Gateway for Connecting Private Multimedia Clouds to Limited Devices. 2011 4th Joint IFIP Wireless and Mobile Networking Conference (WMNC). http://ieeexplore.ieee.org/stamp/stamp.jsp?tp=&arnumber=6097259.
Digital certificate, (n.d.) Computer Literacy Basics: A Comprehensive Guide to IC3, Third Edition. (201 0). Course Technology Cengage Learning. ISBN-13: 978-1-4390-7853-2.
European Patent Application EP 13743243.1 filed on Jan. 30, 2013, Notice of Allowance dated Mar. 23, 2018.
Exchange Server Forums "The SSL Certificate Server Name is incorrect" Forum posts from Aug. 24-25, 2005 (2 pages) http://forums.msexchange.org/m.sub.—160048900/mpage.sub.--1/key.sub.--/t- m.htm#160048900.
Extended European Search Report for EP 13743243.1 dated Sep. 9, 2015.
Furnell, Steven. "An assessment of website password practices." Computers & Security 26.7 (2007): 445-451.
Haidar, A.N.; Zasada, S.J.; Coveney, PV.; Abdallah, A. E.; Beckies, B. Audited Credential Delegation—A User-Centric Identity Management Solution for Computational Grid Environments. 2010 Sixth International Conference on Information Assurance and Security (IAS).http://ieeexplore.ieee.org/stamp/stamp.jsp?arnumber=5604067.
India Patent Application 5781/DELNP/2014 filed on Jan. 30, 2013, 1st Examination Report dated Jan. 31, 2019.
International Search Report and Written Opinion, PCT application No. PCT/US13/23818, dated Apr. 11, 2013, pp. 1-17.
Jake Edge. "Firefox 3 SSL certificate warnings" Published Aug. 27, 2008 (8 pages) http://lwn.net/Articles/295810/.

\* cited by examiner

MANAGING SECURITY CREDENTIALS

CROSS-REFERENCE TO RELATED APPLICATIONS

This application is a continuation of, and claims priority to co-pending U.S. patent application entitled "MANAGING SECURITY CREDENTIALS," filed on Aug. 17, 2017, and assigned application Ser. No. 15/679,205, which is a continuation of, and claims priority to, U.S. patent application entitled "UPDATING MANAGED SECURITY CREDENTIALS," filed on Feb. 24, 2015, and assigned application Ser. No. 14/630,219, which is a continuation-in-part of, and claims priority to, U.S. patent application entitled "MANAGING SECURITY CREDENTIALS," filed on Jul. 29, 2011, and assigned application Ser. No. 13/194,287, which issued as U.S. Pat. No. 9,767,262, each of which is incorporated herein by reference in their entirety.

BACKGROUND

Many web sites require users to log in with a username and password so that the users may be securely identified. Users, however, often forget their username and/or password that are required to log in to a web site. It is also common for users to use the same username and/or password for multiple web sites. Managing tens or even hundreds of usernames and passwords is a major cause of pain for users and results in excessive abandonment rates where users simply fail to sign up for a new service if it requires a new account.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to managing security credentials such as usernames, passwords, security keys, and/or other security credentials. Although passwords may be a strong security credential when used properly, they are often misused. For example, a user may set a relatively weak password, such as a word from a dictionary or a password that is otherwise easy to guess. A user may also set the same password for multiple accounts across multiple network sites and with different security requirements. Thus, if one account is compromised, all other accounts using the same password are also vulnerable.

Thus, many problems associated with using passwords as a security credential are caused by humans being unable to process the type of data that passwords represent. Strong passwords often contain random characters and are long, which makes them hard to remember. Passwords are often not a single chunk of information and can stretch the limits of human working memory. The system disclosed herein largely separates the user from the password, thereby resolving many of the issues. For example, the system may automatically generate a unique, strong password for each network site, using characters selected from the entire set of characters acceptable by the network site. In ordinary use, the user may not need to know the password for the network site. Further, the system may store the password on a server and make the password available to the user across multiple client devices, even on public-use client devices such as kiosks, etc. Access to the centrally stored passwords may be protected by knowledge-based questions, master passwords, and/or other approaches. In the following discussion, a general description of the system and its components is provided, followed by a discussion of the operation of the same.

Figure 1:
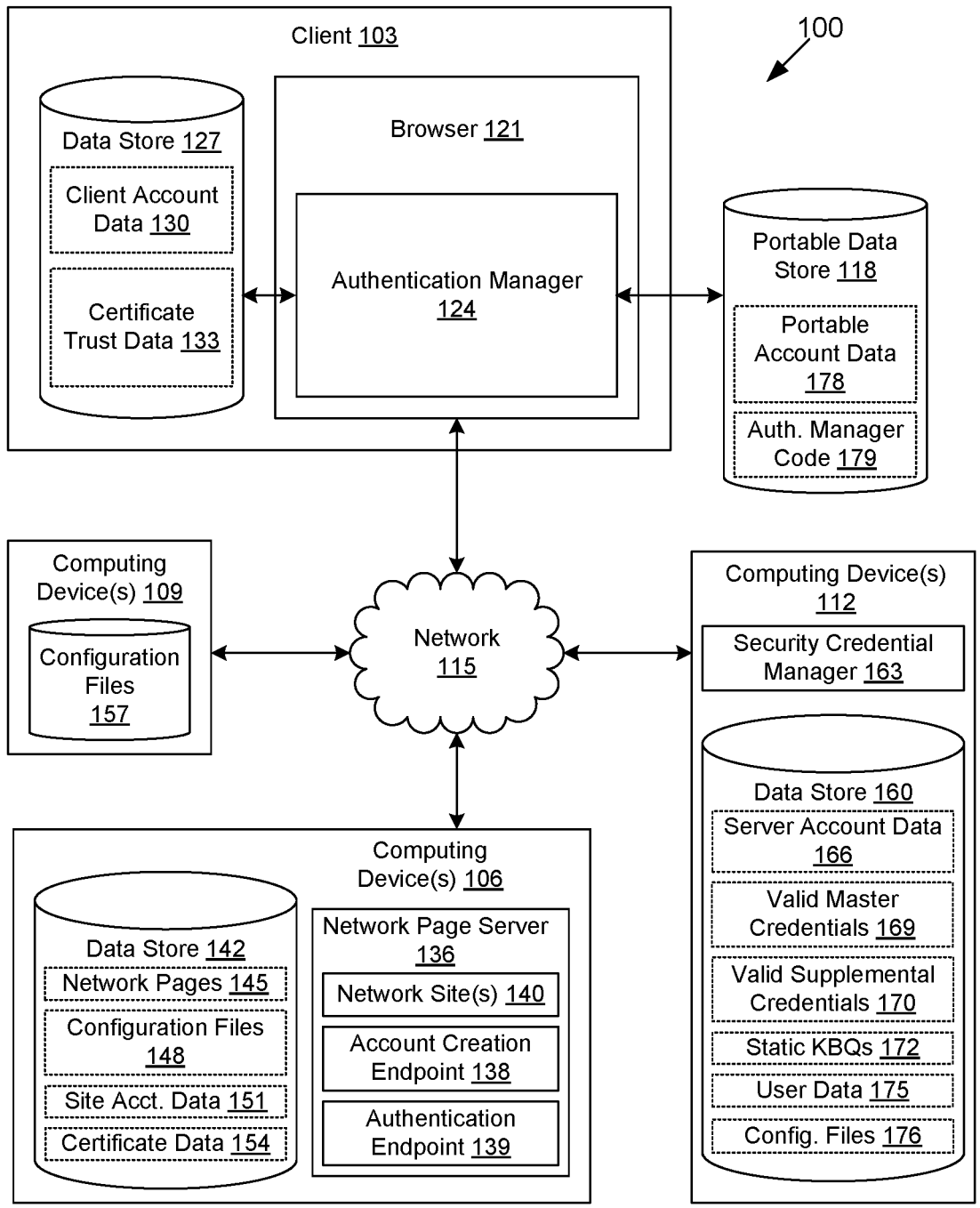
FIG. 1 is a drawing of a networked environment according to various embodiments of the present disclosure.

With reference to FIG. 1, shown is a networked environment 100 according to various embodiments of the present disclosure. The networked environment 100 includes a client 103 that may be in data communication with computing devices 106, computing devices 109, and computing devices 112 by way of a network 115. The network 115 includes, for example, the Internet, intranets, extranets, wide area networks (WANs), local area networks (LANs), wired networks, wireless networks, or other suitable networks, etc., or any combination of two or more such networks. The client 103 may also be in data connection with a portable data store 118 by way of, for example, a local interface, data bus, or another network 115.

The client 103 may comprise, for example, a computer system such as a desktop computer, a laptop computer, personal digital assistants, cellular telephones, smartphones, set-top boxes, music players, web pads, tablet computer systems, game consoles, electronic book readers, kiosks, or other devices with like capability. Further, the client 103 may also comprise any device that is network capable that may communicate with the computing devices 106, 109, 112 over the network 115 to perform various functions. Such clients 103 may comprise, for example, processor-based devices having processor circuits comprising a processor and a memory.

The client 103 may be configured to execute various applications such as a browser 121, an authentication manager 124, and/or other applications. The browser 121 may be executed in a client 103, for example, to access and render network pages, such as web pages, or other forms of network content served up by the computing devices 106 and/or other servers. The authentication manager 124 may be executed to manage usernames, passwords, private and public keys, certificates, and/or other security credentials. In some embodiments, the authentication manager 124 runs as a plug-in application to the browser 121. In other embodiments, the authentication manager 124 may be a standalone application that interfaces with the browser 121 and/or other applications requiring management of authentication. The client 103 may be configured to execute applications beyond browser 121 and authentication manager 124 such as, for example, e-mail applications, instant message applications, and other applications.

The client 103 includes a data store 127, and potentially other data stores, which may comprise data and applications configured to provide access to the data. The data store 127 may be used to store client account data 130, certificate trust data 133, and/or potentially other data. Client account data 130 may include, for example, security credentials used to access various network sites or network pages, information regarding authentication endpoints, and/or other information. In various embodiments, client account data 130 may be stored in an encrypted format. In various embodiments, client account data 130 may be stored ephemerally such that the security credentials are erased upon expiration of a session of the authentication manager 124. Certificate trust data 133 may describe trusted certificate authorities that issue digital certificates used by network sites. Certificate trust data 133 may comprise, for example, public keys associated with the trusted certificate authorities. The public keys may be used to validate the digital signature of a trusted certificate authority on a digital certificate.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

The computing device 106 is configured to execute various applications such as, for example, a network page server 136, an account creation endpoint 138, an authentication endpoint 139, and other applications. The network page server 136 is configured to serve up network pages, such as web pages, and other data from the computing device 106 to various clients 103. The network page server 136 may be configured to send network pages by hypertext transfer protocol (HTTP), hypertext transfer protocol secure (HTTPS), or some other protocol. The network page server 136 may employ encryption using, for example, secure sockets layer (SSL), transport layer security (TLS), and/or some other approach. Non-limiting examples of network page servers 136 include Apache® HTTP Server, Apache® Tomcat, Microsoft® Internet Information Services, and other server applications.

The network page server 136 may be configured to serve up one or more network sites 140. Such a network site 140 is said to be hosted by the network page server 136. A network site 140 may include a set of network pages and/or files associated with a domain name, such as a canonical name, and a directory, such as a root directory (i.e., "/") or some other directory. Each network site 140 may be associated with distinct configuration settings in the network page server 136, while other default configuration settings may be shared across network sites 140.

The account creation endpoint 138 may comprise a network page and/or software configured to facilitate creation of one or more accounts and/or the establishment of security credentials for existing accounts for one or more users at a client 103 for one or more network sites 140. In various embodiments, the authentication manager 124 communicates with the account creation endpoint 138 through the network page server 136. To this end, the account creation endpoint 138 may be a plug-in or other module of the network page server 136, a script or other software embedded within a network page or otherwise within a network site 140 and executed by way of an interpreter or a common gateway interface, or accessed in some other way through the network page server 136. In other embodiments, the account creation endpoint 138 may be a server application executing on the same or a different computing device 106 as the network page server 136.

The authentication endpoint 139 may comprise a network page and/or software configured to facilitate authentication of a user at a client 103 for one or more network sites 140. In various embodiments, the authentication manager 124 communicates with the authentication endpoint 139 through the network page server 136. To this end, the authentication endpoint 139 may be a plug-in or other module of the network page server 136, a script or other software embedded within a network page or otherwise within a network site 140 and executed by way of an interpreter or a common gateway interface, or accessed in some other way through the network page server 136. In other embodiments, the authentication endpoint 139 may be a server application executing on the same or a different computing device 106 as the network page server 136.

The computing device 106 includes a data store 142 and potentially other data stores, which may comprise data and applications configured to provide access to the data. The data store 142 may be used to store network pages 145, configuration files 148, site account data 151, certificate data 154, and/or potentially other data. Network pages 145 may include the network pages and/or files served up for the network sites 140 hosted by the network page server 136. Configuration files 148 may include one or more security credential specifications and/or describe an interface of one or more account creation endpoints 138 and/or authentication endpoints 139. Site account data 151 comprises security credentials and/or other data associated with users of one or more network sites 140. Certificate data 154 comprises digital certificates that may be used by the network page server 136, the authentication endpoint 139, and/or other applications on the computing device 106 to identify a network site and/or encrypt data.

The computing device 109 may comprise, for example, a server computer or any other system providing computing capability. Alternatively, a plurality of computing devices 109 may be employed that are arranged, for example, in one or more server banks or computer banks or other arrangements. For example, a plurality of computing devices 109 together may comprise a cloud computing resource, a grid computing resource, and/or any other distributed computing arrangement. Such computing devices 109 may be located in a single installation or may be distributed among many different geographical locations. For purposes of convenience, the computing device 109 is referred to herein in the singular. Even though the computing device 109 is referred to in the singular, it is understood that a plurality of computing devices 109 may be employed in the various arrangements as described above.

The computing device 109 includes a data store used to store configuration files 157 and potentially other data. The configuration files 157 may include one or more security credential specifications and/or describe an interface of one or more account creation endpoints 138 and/or authentication endpoints 139. The computing device 109 may be, for example, a system configured to provide configuration files 157 corresponding to a plurality of computing devices 106. The computing device 109 may be operated, in some cases, by a third party. In some embodiments, configuration files 157 may correspond to configuration files 148 stored on a computing device 106.

The computing device 112 may comprise, for example, a server computer or any other system providing computing capability. Alternatively, a plurality of computing devices 112 may be employed that are arranged, for example, in one or more server banks or computer banks or other arrangements. For example, a plurality of computing devices 112 together may comprise a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in the various arrangements as described above.

Various applications and/or other functionality may be executed in the computing device 112 according to various embodiments. Also, various data is stored in a data store 160 that is accessible to the computing device 112. The data store 160 may be representative of a plurality of data stores 160 as can be appreciated. The data stored in the data store 160, for example, is associated with the operation of the various applications and/or functional entities described below.

The components executed on the computing device 112, for example, include a security credential manager 163 and other applications, services, processes, systems, engines, or functionality not discussed in detail herein. The security credential manager 163 is executed to provide access to security credentials stored by the computing device 112 in association with a user account with a network site 140. In various embodiments, the security credential manager 163 may be configured to generate user accounts and/or establish security credentials with the network site 140 on behalf of a user at a client 103. In various embodiments, the security credential manager 163 may authenticate clients 103 using a master security credential and/or knowledge-based questions.

The data stored in the data store 160 includes, for example, server account data 166, valid master credentials 169, valid supplemental credentials 170, static knowledge-based questions 172, user data 175, configuration files 176, and potentially other data. The server account data 166 includes security credentials for users for authentication to network sites 140. Such security credentials may be stored in an encrypted form or a non-encrypted form. The server account data 166 may also include information regarding account creation endpoints 138, authentication endpoints 139 and/or other information. The valid master credentials 169 are employed to authenticate users for the security credential manager 163. In one example, the valid master credentials 169 may correspond to hashed versions of a master security credential established by users. The valid supplemental credentials 170 correspond to supplemental credentials that may also be employed to authenticate users for the security credential manager 163. Unlike the master security credential, a combination of one or more valid supplemental credentials 170 along with correct answers to one or more knowledge-based questions may be needed for a user to be authenticated. Respective weights may be applied to each component of a score used to determine authentication.

The static knowledge-based questions 172 correspond to knowledge-based questions for which the user has preconfigured an answer. Such questions may be selected by the user or may be preselected. The user data 175 corresponds to various data associated with users. Such user data 175 may relate to purchase transactions of a user with an online retailer, browsing history, order history, search history, profile information, and/or other data. The user data 175 may be employed to generate dynamic knowledge-based questions as will be described. The user data 175 may correspond to data describing the interactions of a user with a network site 140 in some embodiments. The configuration files 176 may include one or more security credential specifications and/or describe an interface of one or more account creation endpoints 138 and/or authentication endpoints 139.

The portable data store 118 may comprise, for example, a universal serial bus (USB) flash storage device, a solid-state storage device, a portable hard disk, a floppy disk, an optical disc, and/or other portable storage devices. In various embodiments, the portable data store 118 may include a processor circuit comprising a processor and a memory. In other embodiments, the portable data store 118 may merely consist of a storage medium. The portable data store 118 may be removably attached to the client 103 in some embodiments.

The portable data store 118 may be configured to store portable account data 178, authentication manager code 179, and/or other data. The portable account data 178 may include, for example, security credentials used to access various network sites 140 or network pages 145, information regarding authentication endpoints 139, and/or other information. In various embodiments, the portable account data 178 may be a mirror of the client account data 130 or the server account data 166. In other embodiments, the portable account data 178 may take the place of client account data 130 or the server account data 166. The portable account data 178 may be stored in an encrypted format. To this end, the portable data store 118 may include a device (e.g., a fingerprint scanner or other biometric recognition device, a pin pad, etc.) used to authenticate a user in order to provide access to the data on the portable data store 118, such as portable account data 178; or it may include hardware and/or software to permit a user to enter a password and/or decryption key in order to provide access to the data on the portable data store 118. Additionally, in some embodiments, the authentication manager 124 may be stored as authentication manager code 179 on the portable data store 118 and executed in the client 103, for example, when the portable data store 118 is attached to the client 103.

Next, a general description of the operation of the various components of the networked environment 100 is provided. To begin, a user may install authentication manager 124 onto the client 103 and preconfigure the operation of the authentication manager 124 for existing accounts associated with network sites 140. For example, the user may provide to the authentication manager 124 and/or the security credential manager 163 existing security credentials such as, for example, usernames, passwords, security keys, certificates, and/or other security credentials along with identifying information for the network sites 140 and/or uniform resource locators (URLs) associated with the security credentials.

The user may also configure a master security credential such as, for example, a username, password, biometric identification, etc. for the authentication manager 124 so that the security credentials may be encrypted or otherwise protected from use or view on client 103 without the authorization of the user. Where the security credentials are stored in the server account data 166 of the computing devices 112, the user may establish a valid master credential 169 with the security credential manager 163. In some cases, the user may configure answers to static knowledge-based questions 172 with the security credential manager 163.

The account information may be stored by the authentication manager 124 in client account data 130 on the client 103 and/or at some other location. For example, the authentication manager 124 may back up the account information to account data 160 located on the computing device 106, portable account data 178 located on in the portable data store 118, and/or another location. Various techniques relating to storage of the account information on the client 103 are described by U.S. patent application Ser. No. 12/539,886 entitled "AUTHENTICATION MANAGER" and filed on Aug. 12, 2009, which is incorporated herein by reference in its entirety.

In some embodiments, the account information may be centrally hosted in the server account data 166 of the computing devices 112. When the computing devices 112, the portable data store 118, or other storage locations are used to store account information, a user may be able to use the authentication manager 124 and the account information on another client 103. To this end, the authentication manager 124 may be, for example, downloaded, configured, and loaded automatically on another client 103. Additionally, various functions that are described as being performed by the authentication manager 124 may instead be performed by the security credential manager 163. For example, the security credential manager 163 may be configured to create accounts, regenerate security credentials, etc. in place of the authentication manager 124. The authentication manager 124 in some cases may be characterized as a client application of the security credential manager 163.

Security credentials may be shared among multiple users of the authentication manager 124. As a non-limiting example, several users in an organization may share an online banking account. A first user may create a username and password for the account using the authentication manager 124 and/or the security credential manager 163. The first user may mark the account as shared and provide a list of users that are authorized to access the account, including a second user. When the account is distributed to client account data 130, server account data 166, portable account data 178, it may be secured such that only the authorized users can access it. When the second user next uses the authentication manager 124, the second user may be given the opportunity to synchronize the new account with portable account data 178 located in the portable data store 118 belonging to the second user or in some other location.

During the installation process, in one embodiment, the user may specify whether the authentication manager 124 is to operate as a browser 121 plug-in or as a standalone application. The authentication manager 124 may be installed and configured for a plurality of browsers 121 such as Firefox®, Internet Explorer®, Safari®, Chrome®, and/or other browsers 121. The authentication manager 124 may also be configured for a plurality of users on the client 103.

When a user accesses a network site 140 with the browser 121 or another application, the authentication manager 124 determines whether the network site 140 is associated with stored account information, which may be stored, for example, centrally in the server account data 166 or locally in the client account data 130. If the network site 140 is not associated with stored account information, then the authentication manager 124 may notify the user and may prompt the user to provide security credentials if the user has an existing account. The user-provided security credentials may then be stored by the authentication manager 124 in one or more of client account data 130, server account data 166, or portable account data 178.

Alternatively, or additionally, the authentication manager 124 and/or the security credential manager 163 may assist the user in creating an account for the network site 140. The account may be a one-time account, a first account for the user, or a second or subsequent account for the user. The authentication manager 124 and/or the security credential manager 163 may determine how to create an account for a network site 140 based, for example, on the structure of a form embedded within a network page 145. Such a form may be defined in hypertext markup language (HTML), extensible markup language (XML), or some other language.

As a non-limiting example, the authentication manager 124 may identify an account creation form when a submit input element on a network page 145 is associated with text such as "Create Account." The authentication manager 124 may also examine the URL for relevant keywords. As another non-limiting example, the authentication manager 124 may identify an account creation form when a challenge response test (e.g., a "Captcha") is present. The authentication manager 124 may automatically identify required fields for security credentials using, for example, input elements on a network page 145 named "username," "password," or other identifiable names. In various embodiments, the authentication manager 124 may have the user identify the account creation form and/or tag input elements of the form so that the authentication manager 124 may accurately identify how the account may be created with form filling. Such a list of tags can be stored in a configuration file 157 which may then be uploaded to a computing device 109. There, the configuration file 157 can be accessed by other users using the authentication manager 124 and used by them to simplify account creation on the network site 140 described by the configuration file 157. Alternatively, or additionally, configuration files 176 may be stored by the computing device 112 to be accessed by the authentication manager 124, the security credential manager 163, and/or other applications.

In various embodiments, the authentication manager 124 and/or the security credential manager 163 may create the account in an automated way through methods other than form filling. For example, the authentication manager 124 and/or the security credential manager 163 may obtain a configuration file 148 associated with the network site 140 from either the network page server 136 for the network site 140 or a computing device 109 that may provide a configuration file 157 associated with the network site 140. The configuration file 148, 157, 176 may define one or more account creation endpoints 138 for the network site 140 where the authentication manager 124 and/or the security credential manager 163 may authenticate and/or create an account other than by filling out a form. For example, the configuration file 148, 157, 176 may define the URL, parameters, encoding, and/or other information required to create an account in an automated way through an account creation endpoint 138. In some embodiments, one account creation endpoint 138 may be shared by multiple network sites 140 and/or network page servers 136.

The configuration file 148, 157, 176 may also include a security credential specification associated with the network site 140. The security credential specification may specify a character set, minimum length, maximum length, and/or other parameters for usernames and/or passwords. The security credential specification may also specify minimum key length, acceptable algorithms and formats, and/or other parameters applicable to public key infrastructure or other types of security credentials.

The authentication manager 124 and/or the security credential manager 163 may generate one or more security credentials based on the security credential specification. In one embodiment, the security credential manager 163 may be configured to obtain the security credential specifications according to a subscription-based push model. In another embodiment, the security credential manager 163 may be configured to pull the security credential specifications from the computing device 106 or 109 at regular intervals.

When the authentication manager 124 and/or the security credential manager 163 is creating an account by form filling, the authentication manager 124 may prompt the user to supply a security credential specification so that the authentication manager 124 and/or the security credential manager 163 may generate one or more security credentials to be filled in on the form. The user may see information regarding required attributes for security credentials displayed on the network page 145 near the account creation form. The authentication manager 124 may provide options including, but not limited to, length of the security credential, directions to use a certain character set, directions to use at least one number, directions to use at least one non-alphanumeric character, and other options.

As a non-limiting example, the authentication manager 124 may present a graphical interface to the user listing various attributes that may be used in generating the security credentials. Such a graphical interface may include, for example, checkboxes, radio buttons, drop-down boxes, text fields, text areas, etc. The graphical interface may be preconfigured with default selections. Where the security credentials are generated by the security credential manager 163, the security credential manager 163 may perform the form filling, or the security credentials may be transferred to the authentication manager 124 for the authentication manager to perform the form filling.

In various embodiments, when the authentication manager 124 is creating an account by form filling, the authentication manager 124 may replace, for example, the normal user interaction in filling out the form with a wizard interface. The wizard interface may omit tasks or fields that may be done automatically by the authentication manager 124. However, the wizard interface may obtain input from the user in order to fill out fields such as "Captchas" and other challenge response tests. Although the authentication manager 124 and/or the security credential manager 163 may be configured to fill out fields pertaining to other personal information (e.g., name, date of birth, social security number, phone number, address, etc.), the authentication manager 124 may instead be configured to prompt the user for that information. In various embodiments, the authentication manager 124 may leave unrecognized form fields blank for the user to complete.

Accordingly, the authentication manager 124 and/or browser 121 sends an account creation request associated with the generated security credential to the network site 140. After the account creation request is submitted, the account will either be created or not created for the network site 140. The network site 140 typically provides a response page indicating whether the account creation was successful. Such a network page 145 may be parsed automatically by the authentication manager 124 or may be left for additional user input to the authentication manager 124.

In some cases, the response page will include another form with an indication that there was a problem. As a non-limiting example, a username field may be highlighted with an explanation that the specified username was already taken. The authentication manager 124 may be configured to respond automatically to such requests and/or to seek user input. Account creation responses through an authentication endpoint 139 may be handled by the authentication manager 124 in an analogous way. In one embodiment, the authentication manager 124 may simply assume that the account was created.

Responsive to account creation, the authentication manager 124 and/or the security credential manager 163 store the account information including, but not limited to, security credentials, URLs, and domain names associated with the account and network site 140, in one or more of client account data 130, server account data 166, or portable account data 178. In particular, the network site 140 or authentication endpoint 139 may present a trusted certificate from certificate data 154 during the account creation process. Information relating to this trusted certificate, including domain name, certificate authority, and other information from the certificate, may be stored with the account information. The account information may consequently be marked as usable on a network site 140 corresponding to the domain name provided in the trusted certificate, or only for a network site 140 able to present that specific certificate in higher assurance environments. Account information stored in any of client account data 130, server account data 166, or portable account data 178 may be manually or automatically copied by the authentication manager 124 and/or the security credential manager 163 to any other client account data 130, server account data 166, or portable account data 178 so that the account information may be mirrored across any two or more of client account data 130, server account data 166, or portable account data 178.

For purposes of backup, the authentication manager 124 and/or the security credential manager 163 may be capable of rendering a list of the stored account information in client account data 130, server account data 166, or portable account data 178 for viewing or printing. To facilitate viewing or printing, the authentication manager 124 and/or the security credential manager 163 may be configured to generate human readable or printable security credentials using an appropriate character set. Alternatively, the authentication manager 124 and/or the security credential manager 163 may encode security credentials in a printable form using an encoding approach such as, for example, UUencoding, BinHex, Multipurpose Internet Mail Extensions (MIME) encodings, Base64, and other encoding approaches.

When a stored account exists for a network site 140, the authentication manager 124 and/or the security credential manager 163 determines whether to provide the security credentials to the network site 140. As a preliminary matter, the authentication manager 124 and/or the security credential manager 163 may require that the user be authenticated to the authentication manager 124 and the security credential manager 163 by way of a master security credential such as a password, presence of the portable data store 118 at the client 103, biometric identification, native operating system identification, or some other authentication. Responsive to authentication, the authentication manager 124 may decrypt the stored client account data 130, server account data 166, or portable account data 178. In some embodiments, the authentication manager 124 may be given access to the stored client account data 130, server account data 166, or portable account data 178 responsive to providing a master security credential. The authentication manager 124 then verifies the identity of the network site 140.

Verifying the identity of the network site 140 may be performed, for example, by comparing a domain name associated with a trusted certificate provided by a network site 140 at the time of logon with the domain name associated with the network site 140 in the stored account information. The authentication manager 124 may compare the domain name associated with the trusted certificate provided by the network site 140, for example, with a domain name provided by a user, a domain name inferred by heuristic analysis, or some other domain name, in order to identify which stored account the network site 140 appears to resemble. Verifying the identity of the network site 140 through the use of trusted certificates may be less susceptible to spoofing attacks than by verifying the identity merely through domain name service (DNS) name resolution, for example, or comparing a stored domain name to what is displayed in the address bar of the browser 121.

If the network site 140 provides no certificate (e.g., authentication under HTTP) or if the certificate is not trusted (e.g., self-signed or issued by a certificate authority not considered to be trusted in the certificate trust data 133), the authentication manager 124 may display a warning to the user. In some cases, the user may accept the warning and continue. In some embodiments, the authentication manager 124 may remember such characteristics and use them to aid in future identity verification of the network site 140. In other cases, the authentication manager 124 may identify a clear use of a spoofing attack or other phishing attempt and provide additional warnings, disable authentication at the particular network site 140, require reauthentication by the user to the authentication manager 124, and/or take other precautions. Additionally, by integrating the authentication manager 124 with a site providing reputation data for network sites 140, the authentication manager 124 can warn the user that a network site 140 is hostile.

The authentication manager 124 may additionally verify the identity of the network site 140 by other methods. One verification method may comprise comparing the contents of the address bar in the browser 121 with a stored URL or domain name. A second verification method may comprise comparing contents of the HTTP headers sent by the accessed network site 140 with a stored URL or domain name. A third verification method may comprise performing a reverse DNS look-up on an Internet Protocol (IP) address associated with the accessed network site 140 and comparing that domain name with a stored URL or domain name. Other verification methods may also be employed. More secure methods may be employed prior to downgrading to less secure methods, and the user may specify acceptable methods of proving the identity of network sites 140.

Once the identity of a network site 140 is verified, the authentication manager 124 may provide the security credentials to the network site 140 automatically through an authentication endpoint 139 or may obtain user confirmation. If the authentication manager 124 is configured to obtain user input, the authentication manager 124 may render a button or other user interface feature in or on top of the browser 121 to obtain confirmation.

When no authentication endpoint 139 is defined for a network site 140, the authentication manager 124 may be configured to detect whether an authentication form is presented. The authentication manager 124 may examine the network page 145 for elements such as a submit input element associated with text such as "Log In," input fields matching "username" and/or "password," fields using the password type, and other identifying elements. The authentication manager 124 may also examine the URL for relevant keywords. In some embodiments, the authentication manager 124 and/or the security credential manager 163 may store a URL associated with the network site 140 in client account data 130, server account data 166, or portable account data 178, which may be used for authentication. The authentication manager 124 may provide the security credentials to the network site 140 by form filling. The submission of such a form may be automatic or may be subject to user input such as selection of a "Submit" or "Log In" button or other user interface element.

In some cases, the user may forget the master security credential or may not have access to the master security credential on another client 103. The user may then be able to either reset the master security credential, or gain at least temporary access to stored security credentials, through a procedure implemented by the security credential manager 163. Upon a user selecting a master security credential or reset option, the security credential manager 163 may generate a user interface providing one or more knowledge-based questions. For example, the user interface may correspond to a network page for rendering in the browser 121. Alternatively, data may be sent to the authentication manager 124 in order for a user interface to be rendered by the authentication manager 124.

The user interface may present static knowledge-based questions 172 that are preconfigured by the user. For example, the user interface may present a question of "What is your mother's maiden name?," "In what city were you born?," "What was the mascot of your high school?," and so on. The user interface may present true questions or false questions. True questions correspond to questions that can be validated by both the user and the security credential manager 163 that are unique to the user. False questions are those designed to catch an attacker who is attempting gain unauthorized access to the security credentials. For example, a false question may be: "What was the last payment amount for the truck you lease?" where the correct answer should be: "I do not have a truck."

Furthermore, the user interface may present knowledge-based questions that are dynamically generated by the security credential manager 163. With dynamically generated questions, the user may have no foreknowledge as to what type of questions will be asked. Dynamically generated questions may employ user data 175 including unique customer information such as purchase transaction history and/or other data. One example of a dynamically generated question may be: "I see that you purchased an item from E-Retailer yesterday, can you tell me the bill amount?"

Multiple knowledge-based questions may be presented in a user interface. The answers to the knowledge-based questions may be used by the security credential manager 163 to generate a score. When the score meets a predefined threshold (e.g., one question answered correctly, three questions answered correctly, one dynamically generated question based on recent data answered correctly, etc.), the user may be granted access to the stored security credentials of the server account data 166 and/or access to establish a new valid master credential 169. It is noted that different weighting may be applied to different types of questions in generating a score. For example, dynamic questions based on a recent event may be given a greater weight than a static question based on information obtained during account creation. In the case of new or infrequent users for whom insufficient user data 175 is present for dynamically generated questions, the security credential manager 163 may fall back to employ the static knowledge-based questions 172.

Once a user is authenticated by the security credential manager 163 through the use of knowledge-based questions, or through a valid master security credential, security credentials of the user from the server account data 166 may be downloaded to the client account data 130 for use by the authentication manager 124. In one example, the client 103 corresponds to a kiosk or another public-use client 103. In such an example, the security credentials may be maintained ephemerally in the memory of the client 103 such that they are erased from memory when the user logs out, exits the browser 121, or otherwise ends the session of the authentication manager 124. Alternatively, the security credentials may be saved to the client account data 130 for future use through the client 103.

Moreover, once a user is authenticated by the security credential manager 163, the user may be presented with an opportunity to set a new security credential. For example, the user may supply the new security credential with or without the previous security credential. The valid master credentials 169 are updated by the security credential manager 163 to store the new valid master credential 169. It is noted that the valid master credential 169 may be hashed or otherwise encoded.

The security credential manager 163 may also be employed to generate or regenerate security credentials according to security credential specifications in the configuration files 176. In addition to initial account creation and configuration, the security credential manager 163 may be configured to regenerate security credentials periodically or when triggered by a user or administrator. For example, an administrator may trigger an automatic regeneration of security credentials for many users with accounts for a certain network site 140 in response to a potential security compromise. Upon regeneration of the security credentials, the security credential manager 163 may establish the newly generated security credentials with the various network sites 140 using the appropriate account creation endpoint 138. The security credential manager 163 may supply a previous security credential to facilitate establishing the newly generated security credential. The security credentials may be generated or regenerated to have a maximum security strength allowed by the security credential specification.

Figure 2:
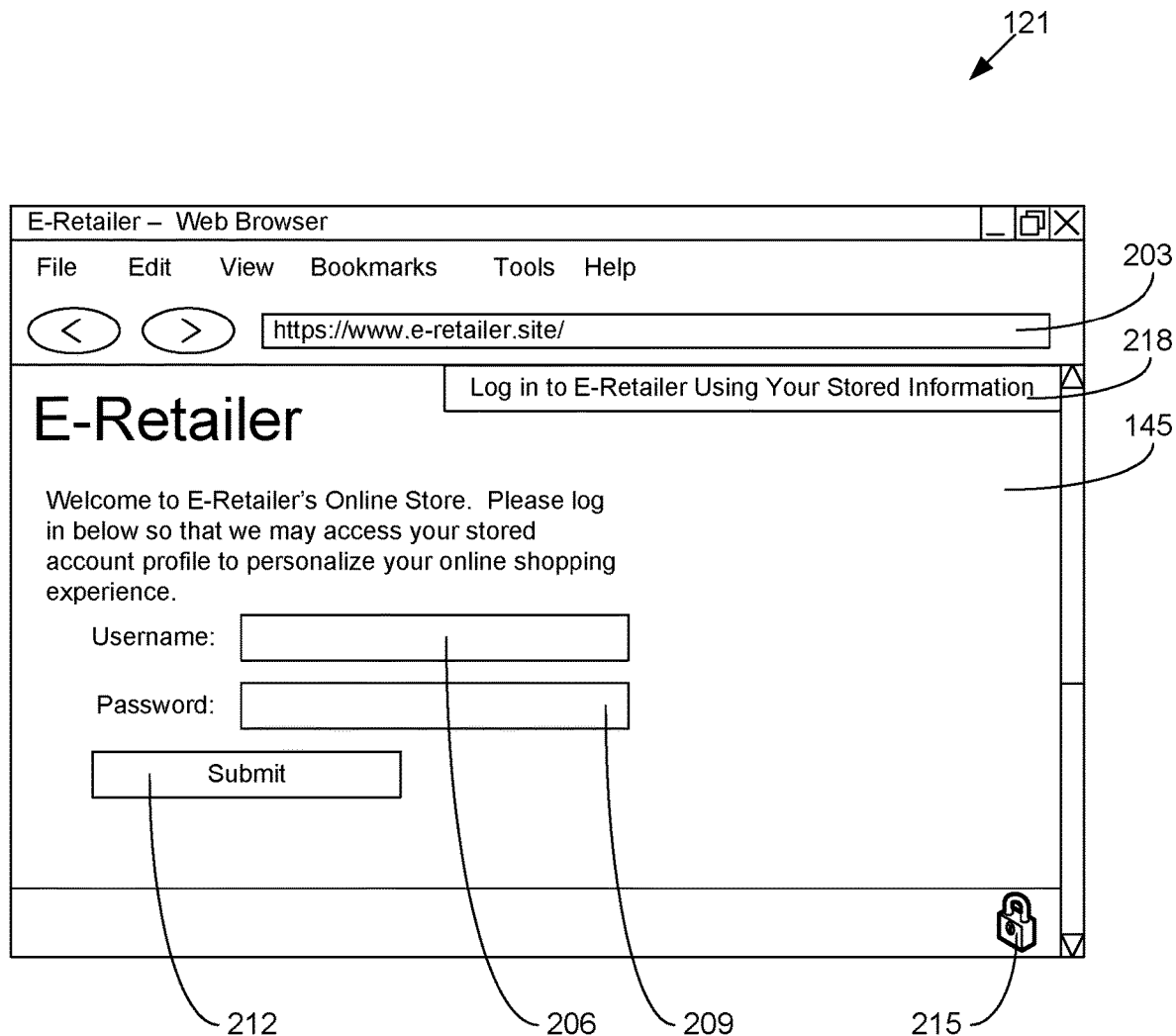
FIGS. 2-4 depict examples of network pages rendered by a browser executed in a client in the networked environment of FIG. 1 according to various embodiments of the present disclosure.

Turning now to FIG. 2, shown is an example of a network page 145 (FIG. 1) rendered by a browser 121 (FIG. 1) executed in a client 103 (FIG. 1) in the networked environment 100 (FIG. 1) according to various embodiments of the present disclosure. In this example, the user may have entered, or may have been automatically redirected to, the URL "https://www.e-retailer.site/," which is displayed in the address bar 203 of the browser 121. The network page 145 provided by the network site 140 (FIG. 1) in response to the URL includes an authentication form having a username field 206, a password field 209, and a submit button 212.

The browser 121 includes a security indication 215 that indicates that the network site 140 has presented a trusted certificate and the communication between the client 103 and the computing device 106 (FIG. 1) is being encrypted.

In FIG. 2, the authentication manager 124 (FIG. 1) has verified the identity of the network site 140 and is presenting an authentication button 218. The authentication button 218 indicates that account information associated with the network site 140 is stored in client account data 130, server account data 166, or portable account data 178.

Once a user selects the authentication button 218, the authentication manager 124 may fill in the username field 206 and the password field 209. The authentication manager 124 may also automatically submit the logon request by programmatically pressing the submit button 212. In some embodiments, the username field 206 and password field 209 may be prefilled automatically with the security credential upon verification of the identity of the network site 140. The security credentials may be shown as place holding characters or as plain text.

Alternatively, if, for example, an authentication endpoint 139 (FIG. 1) is defined, the authentication manager 124 or the security credential manager 163 (FIG. 1) may authenticate in the background. The authentication manager 124 may give an indication of success or failure and may provide another authentication button 218 in order to log out of the network site 140. If multiple user accounts are present for the network site 140, the authentication manager 124 may provide a drop-down box or other user interface element allowing the user to select one of the accounts for authentication.

Figure 3:
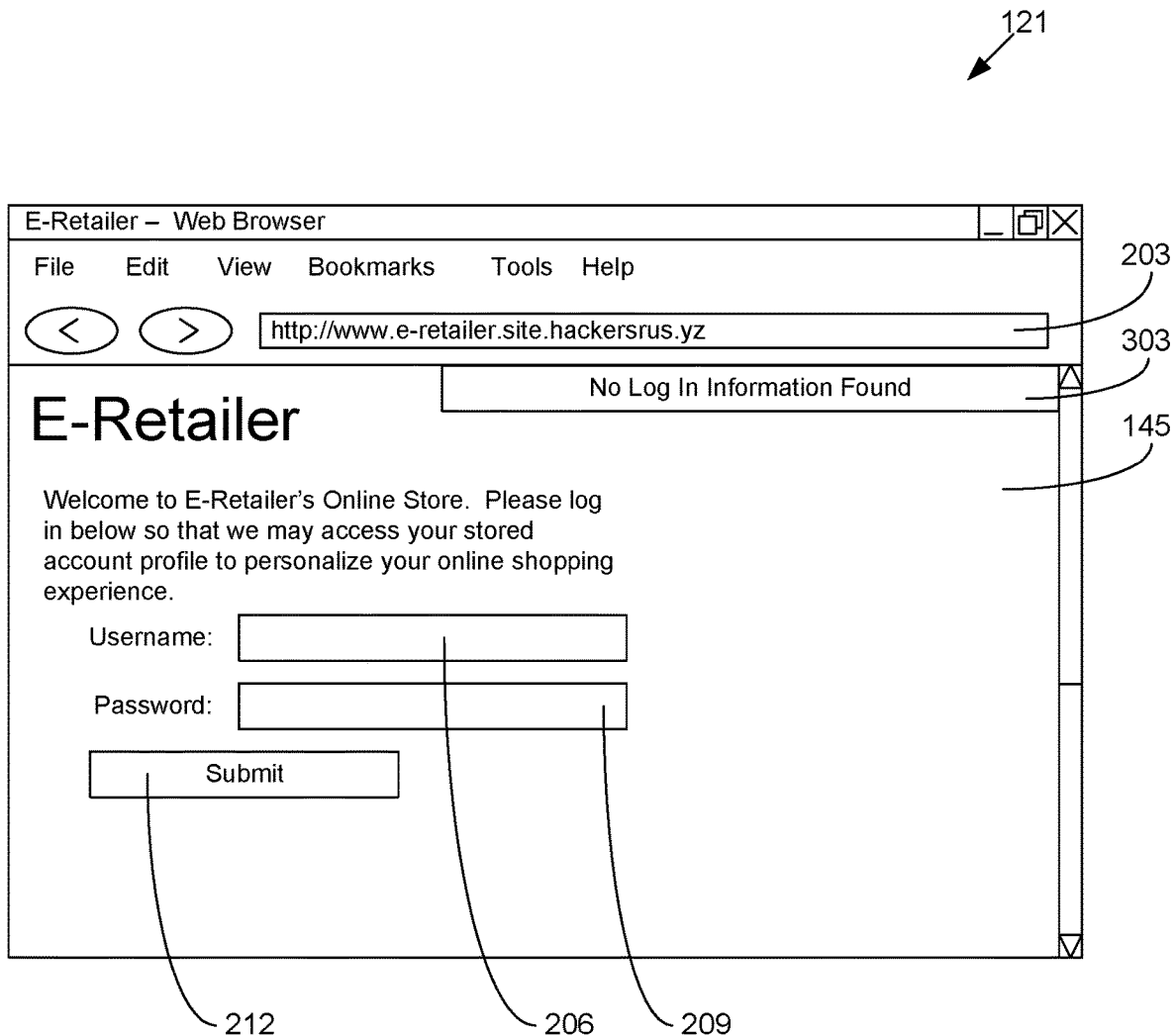

Referring next to FIG. 3, shown is another example of a network page 145 (FIG. 1) rendered by a browser 121 (FIG. 1) executed in a client 103 (FIG. 1) in the networked environment 100 (FIG. 1) according to various embodiments of the present disclosure. In this example, the user may have entered, or may have been automatically redirected to, a different URL such as "https://www.e-retailer-.site.hackersrus.yz/," which is displayed in the address bar 203 (FIG. 2) of the browser 121. The network page 145 provided by the network site 140 (FIG. 1) in response to the URL includes an authentication form having a username field 206 (FIG. 2), a password field 209 (FIG. 2), and a submit button 212 (FIG. 2).

FIG. 3 represents an example of a common phishing scheme, where a network page 145 is presented by a fraudulent network site 140 having a look-and-feel that is identical or nearly identical to the network page 145 presented by the legitimate network site 140. See FIG. 2. Although the URL in this example includes the domain name of the legitimate network site 140, the URL is not identical and is in fact a subdomain of "hackersrus.yz." In this case, the authentication manager 124 (FIG. 1) cannot verify the identity of the network site 140 by way of the URL presented in the address bar 203 because the domain name in the URL is not a subdomain of, or identical to, the stored domain name "e-retailer.site" or "www.e-retailer.site."

The network site 140 in FIG. 3 cannot be identified additionally because the network site 140 has not presented a trusted certificate as the security indication 215 (FIG. 2) is absent. Various phishing attacks may involve presenting a trusted certificate associated with the name of some other network site 140 or a real certificate for the fraudulent network site 140. Other phishing attacks may involve substituting a security indication 215 that is faked. The authentication manager 124 may avoid such attacks because it is not deceived by graphical appearances but instead may examine the network page 145 and certificate data received behind the scenes by the browser 121. The authentication manager 124 determines that this network site 140 in FIG. 3 has no stored security credentials. Thus, in this non-limiting example, the authentication manager 124 presents an information button 303 in place of an authentication button 218 (FIG. 2) that states "No Log In Information Found."

In some embodiments, the authentication manager 124 and/or the security credential manager 163 (FIG. 1) may employ a heuristic analysis of the network page 145 and/or reputation data to identify fraudulent sites proactively. For example, the authentication manager 124 or the security credential manager 163 may perform a heuristic analysis to determine whether a network page includes a logon form that is a fraudulent copy of a logon form associated with a stored domain name. In such cases, the authentication manager 124 may provide a warning to the user. Additionally, if the user were to request that the authentication manager 124 provide the security credentials used for a legitimate network site 140 to a fraudulent network site 140 (e.g., if the domain name of a trusted certificate of the fraudulent network site 140 does not match the stored domain name associated with the legitimate network site 140), the authentication manager 124 may generate a warning.

Figure 4:
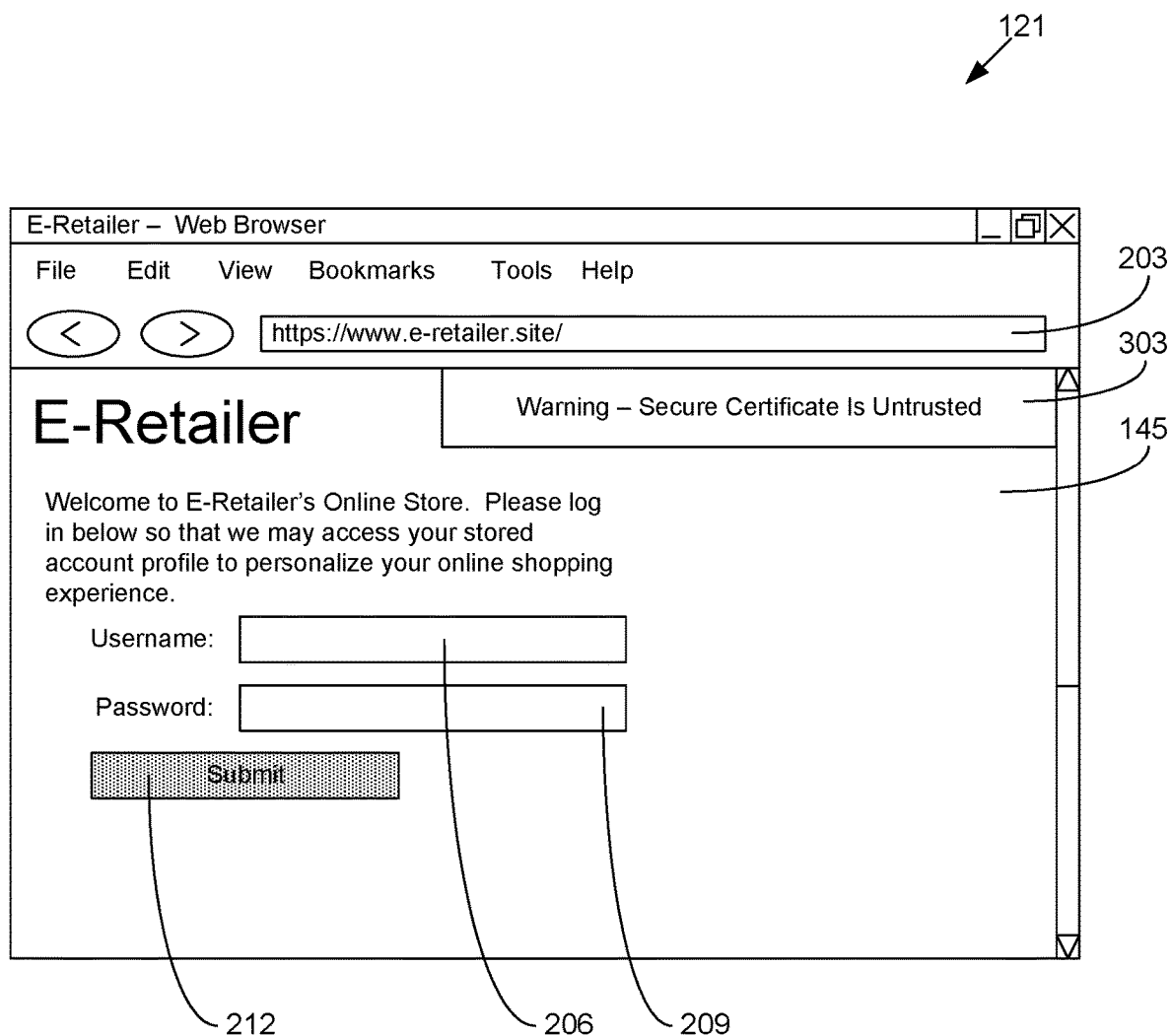

Moving on to FIG. 4, shown is an example of a network page 145 (FIG. 1) rendered by a browser 121 (FIG. 1) executed in a client 103 (FIG. 1) in the networked environment 100 (FIG. 1) according to various embodiments of the present disclosure. In this example, the browser 121 appears similar to that depicted in FIG. 2, except that the authentication manager 124 (FIG. 1) has provided an information button 303 (FIG. 3) in place of an authentication button 218 (FIG. 2). The address bar 203 (FIG. 2) appears to depict the URL of the legitimate network site 140 (FIG. 1). However, the secure certificate was issued by an untrusted certificate authority. Thus, the security indication 215 (FIG. 2) is absent. Also, the submit button 212 may be disabled or grayed out to prevent or discourage users from submitting information using the form. The username field 206 and the password field 209 may also be disabled or grayed out to prevent or discourage data entry in those fields.

The inconsistency may be explained by spoofing attacks according to various methods such as, for example, a man-in-the-middle attack and other attacks. As a non-limiting example, the client 103 may have been provided misbehaving and/or compromised DNS servers through the dynamic host configuration protocol (DHCP). The misbehaving DNS servers may be configured to give inaccurate domain name information. By contrast, malicious users are less likely to be able to comprise a trusted certificate authority because public key infrastructure is used. Here, the authentication manager 124 has determined that a network site 140 is not verified and has not provided the security credentials. An ordinary user, however, may have been misled and supplied the security credentials to the fraudulent network site 140.

In some cases, the inconsistency may result from a legitimate network site 140 changing its certificate provider. The authentication manager 124 may include a configuration setting to enable a warning when the certificate authority signing the secure certificate for a network site 140 changes from the certificate authority that issued the secure certificate that the authentication manager 124 received when the security credential was previously created or stored for the network site 140.

Figure 5:
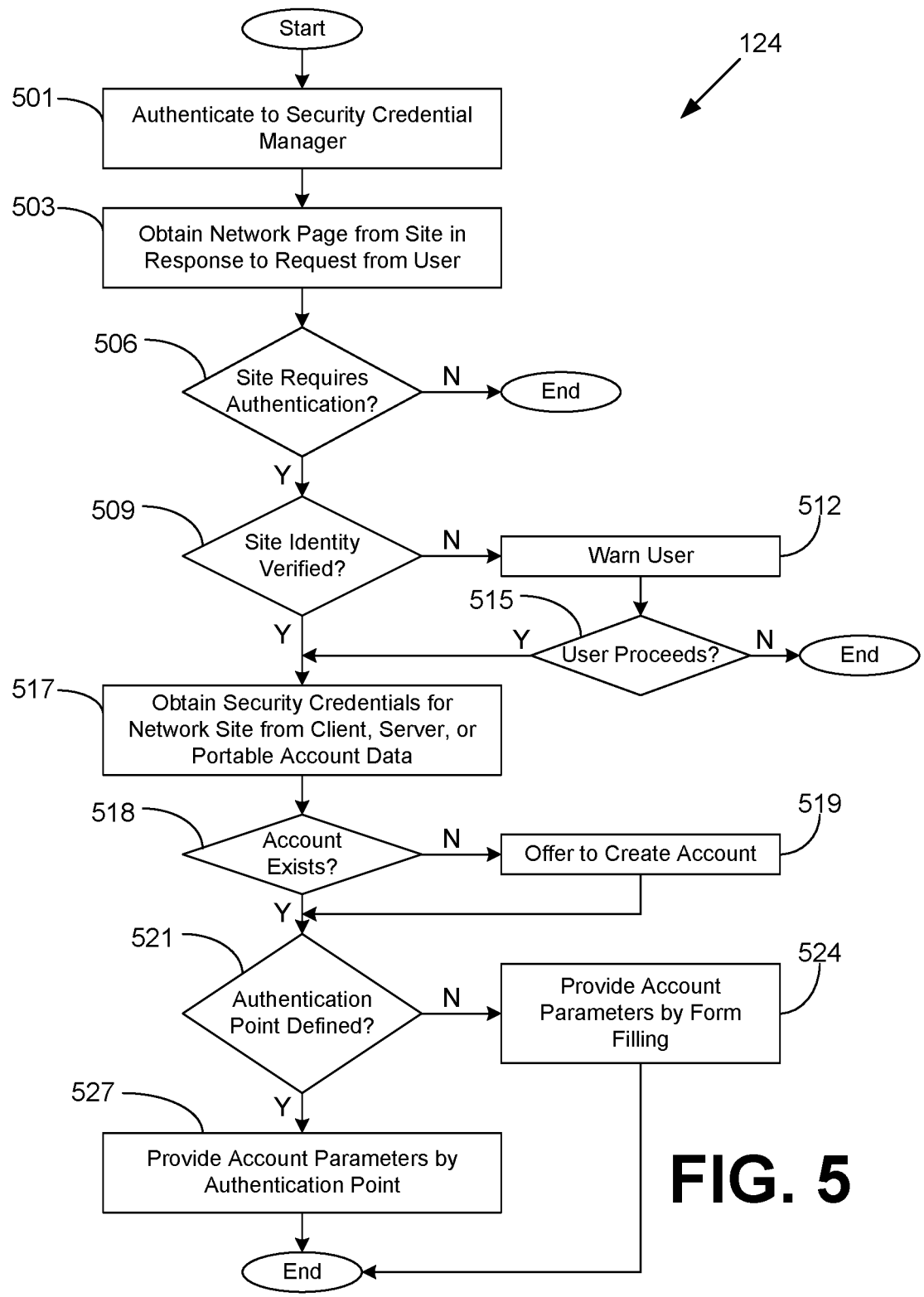
FIG. 5 is a flowchart illustrating one example of functionality implemented as portions of an authentication manager executed in a client computing device in the networked environment of FIG. 1 according to various embodiments of the present disclosure.

With reference to FIG. 5, shown is a flowchart that provides one example of the operation of a portion of the authentication manager 124 (FIG. 1) according to various embodiments. It is understood that the flowchart of FIG. 5 provides merely an example of the many different types of functional arrangements that may be employed to implement the operation of the portion of the authentication manager 124 as described herein. As an alternative, the flowchart of FIG. 5 may be viewed as depicting an example of steps of a method implemented in the client 103 (FIG. 1) according to one or more embodiments.

Beginning with box 501, the authentication manager 124 authenticates to the security credential manager 163 (FIG. 1). To this end, a user interface may be rendered by the authentication manager 124 to collect a master security credential or obtain answers to one or more knowledge-based questions. In some cases, the master security credential may be stored by the client 103. In one embodiment, the authentication manager 124 may download all security credentials from the security credential manager 163 to the client 103 upon authentication. In another embodiment, the authentication manager 124 may download security credentials for particular network sites 140 (FIG. 1) on demand as they are needed.

In box 503, the authentication manager 124 obtains a network page 145 (FIG. 1) from a network site 140 in response to a request by a user. In various embodiments, the network page 145 may be obtained through operation of the browser 121 (FIG. 1). Next, in box 506, the authentication manager 124 determines whether the network site 140 requires authentication. This determination may be based, for example, on the presence of an authentication form on the network page 145 or some other network page 145 on the network site 140, the presence of a configuration file 148, 157 (FIG. 1), on user input, or on other factors. If authentication is not required by the network site 140, the control flow of the authentication manager 124 stops.

After determining that a network site 140 requires authentication, the authentication manager 124 proceeds to box 509. In box 509, the authentication manager 124 determines whether the identity of the network site 140 can be verified. This verification may involve, for example, examination of a domain name associated with a trusted certificate received in connection with the network page 145.

If the authentication manager 124 cannot verify the identity of the network site 140, the authentication manager 124 moves to box 512 and warns the user that the identity of the site cannot be verified and/or notifies the user that no stored account information can be found. Next, the authentication manager 124 determines in box 515 whether the user has indicated to proceed with authentication nonetheless using other stored account information. In some embodiments, the authentication manager 124 may preclude the user from proceeding with authentication. If the user has not indicated to proceed, the control flow of the authentication manager 124 stops. If the user has indicated to proceed in box 515, the authentication manager 124 moves to box 517. If in box 509 the identity of the network site 140 has been verified, the authentication manager 124 also moves to box 517.

In box 517, the authentication manager 124 obtains, or attempts to obtain, security credentials for the network site. The credentials for the network site may be stored locally in the client account data 130, stored remotely in the server account data 166, or mirrored in the portable account data 178 (FIG. 1). In box 518, the authentication manager 124 determines whether an account exists for the network site 140. This determination may be made by comparing the domain name associated with the request with stored domain names in client account data 130, server account data 166, or portable account data 178. Additionally, the user may provide a domain name to the authentication manager 124 which the user believes to correspond to the network site 140 in order to locate a stored account.

If the authentication manager 124 determines that an account does not exist, the authentication manager 124 proceeds to box 519 and offers to create an account for the user. In some embodiments, account creation is performed by the security credential manager 163. Additional accounts for the same network site 140 may be created by the authentication manager 124 in response to user input. The authentication manager 124 proceeds to box 521. If the authentication manager 124 determines in box 518 that the account does exist, the authentication manager 124 also proceeds to box 521.

Next, in box 521, the authentication manager 124 determines whether an authentication endpoint 139 (FIG. 1) has been defined for the network page 145 or network site 140. This may involve examining, if they exist, configuration files 148, 157 (FIG. 1). If an authentication endpoint 139 has not been defined, the authentication manager 124 moves to box 524 and provides the account parameters, including security credentials, by form filling. The authentication manager 124 may send the account parameters to the network site 140 or may merely allow the user to submit the form. The control flow of the authentication manager 124 then stops.

If in box 521 the authentication manager 124 determines that an authentication endpoint 139 has been defined, the authentication manager 124 proceeds to box 527 and provides the account parameters by way of the authentication endpoint 139. The authentication manager 124 may send the account parameters to the network site 140 or wait for user input for approval. The control flow of the authentication manager 124 then stops.

Figure 6:
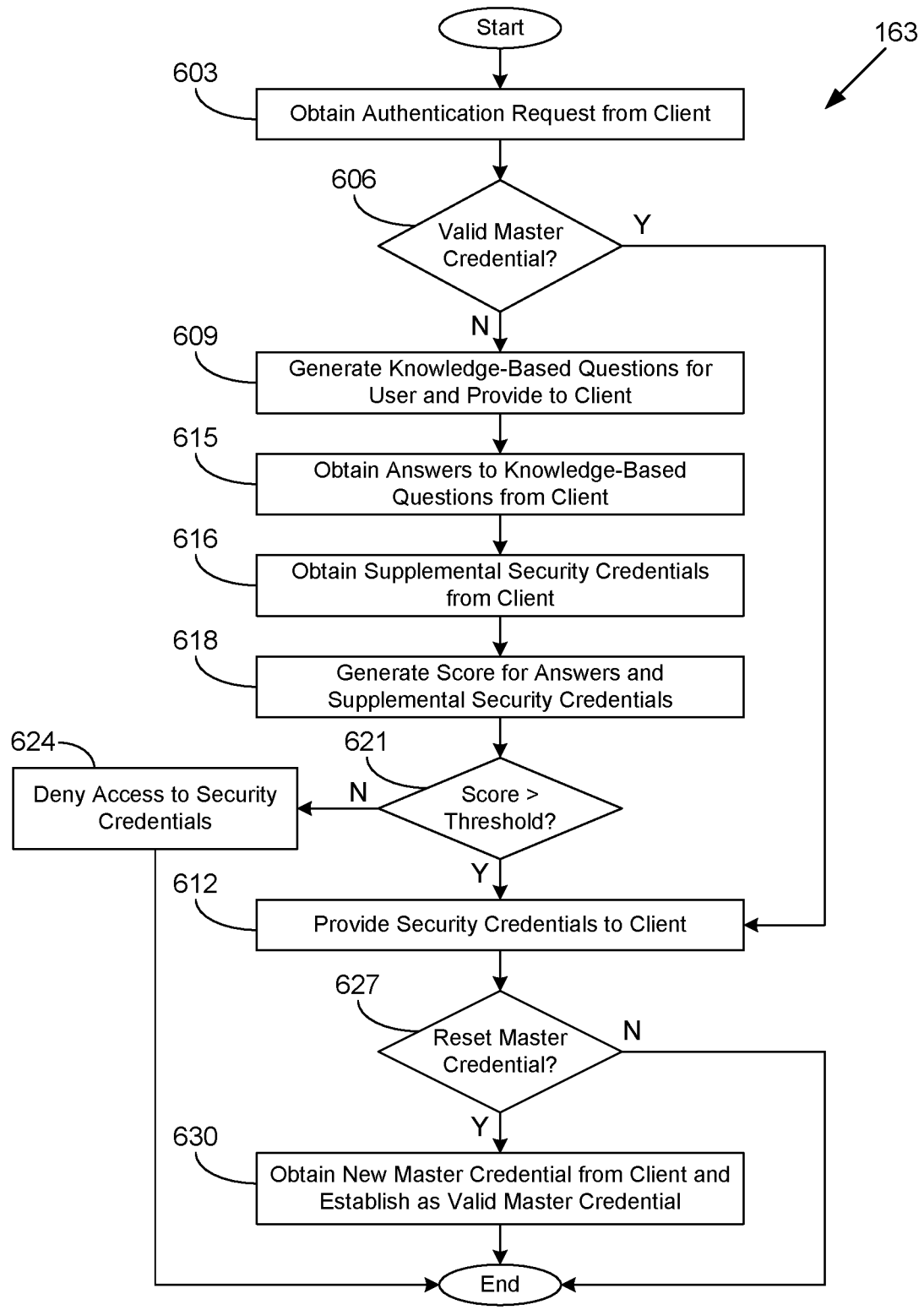
FIGS. 6 and 7 are flowcharts illustrating examples of functionality implemented as portions of a security credential manager executed in a computing device in the networked environment of FIG. 1 according to various embodiments of the present disclosure.

Referring next to FIG. 6, shown is a flowchart that provides one example of the operation of a portion of the security credential manager 163 according to various embodiments. It is understood that the flowchart of FIG. 6 provides merely an example of the many different types of functional arrangements that may be employed to implement the operation of the portion of the security credential manager 163 as described herein. As an alternative, the flowchart of FIG. 6 may be viewed as depicting an example of steps of a method implemented in the computing device 112 (FIG. 1) according to one or more embodiments.

Beginning with box 603, the security credential manager 163 obtains an authentication request from a client 103 (FIG. 1). The request is associated with a user account. The authentication request may specify a master security credential in some cases. In box 606, the security credential manager 163 determines whether the authentication request includes a valid master credential. To this end, if a master security credential is specified, the security credential manager 163 may generate a hashed version of the master security credential and compare the hashed version with the valid master credential 169 (FIG. 1) for the user account. In various embodiments, the master security credential may employ public-key cryptography, one-time passwords sent through alternate communication channels (e.g., a one-time password sent to the cell phone of the user), a quick response (QR) code captured by a cell phone, etc. If the request does not include a valid master credential, the security credential manager 163 moves to box 609. If the request does include a valid master credential, the client 103 is authenticated and the security credential manager 163 moves to box 612.

In box 609, when the client 103 cannot be authenticated via a master security credential, the security credential manager 163 generates one or more knowledge-based questions for the user. In some cases, the questions may be dynamically generated based on user data 175 (FIG. 1) such as recent purchase transaction data. In other cases, the questions may be retrieved from the static knowledge-based questions 172 chosen and answered by the user or generated from static information gathered during initial account creation. The knowledge-based questions are provided to the client 103 for rendering in a user interface. In one example, the knowledge-based questions are included in one or more network pages.

In box 615, the security credential manager 163 obtains answers to the knowledge-based questions from the client 103 over the network 115 (FIG. 1). In box 616, the security credential manager 163 may obtain one or more supplemental security credentials from the client 106. Such supplemental security credentials may include shared secret passwords, a QR code, a one-time password, a Rivest Shamir Adleman (RSA) token, cookie data, Flash cookie data, internet protocol (IP) addresses, and/or other forms of supplemental security credentials. In box 618, the security credential manager 163 generates a score based on the answers provided by the user at the client 103 and the correct answers to the questions. Where supplemental security credentials are employed, the score may be generated based at least in part on valid supplemental credentials 170 (FIG. 1) that are provided by the user. Different questions and/or supplemental security credentials may be weighted differently in computing the score. For example, questions based on events may be weighted according to the recency of the event. As another example, a valid supplemental RSA token may be weighted more heavily than a valid IP address.

In box 621, the security credential manager 163 determines whether the score meets a minimum predefined threshold for authentication via knowledge-based questions and/or supplemental security credentials. If the score does not meet the minimum predefined threshold, the security credential manager 163 moves to box 624 and denies the user at the client 103 access to stored security credentials in the server account data 166 (FIG. 1). Thereafter, the portion of the security credential manager 163 ends. Otherwise, if the score does meet the minimum predefined threshold, the security credential manager 163 proceeds to box 612.

In box 612, the security credential manager 163 provides the security credentials to the client 103 over the network 115. The security credentials may be provided over an encrypted channel such as, for example, SSL, TLS, and so on. The authentication manager 124 (FIG. 1) executed in the client 103 may subsequently use the security credentials to authenticate with one or more network sites 140 (FIG. 1).

In box 627, the security credential manager 163 determines whether the valid master credential 169 is to be reset by the user. If the valid master credential is to be reset, the security credential manager 163 moves to box 630 and obtains a new master security credential from the client 103. The new master security credential may then be established by the security credential manager 163 as the valid master credential 169. In another embodiment, the security credential manager 163 may obtain the previous master security credential from the user in order to change the master security credential instead of resetting it. Thereafter, the portion of the security credential manager 163 ends. If the security credential manager 163 determines in box 627 that the master security credential is not to be reset, the portion of the security credential manager 163 also ends.

Figure 7:
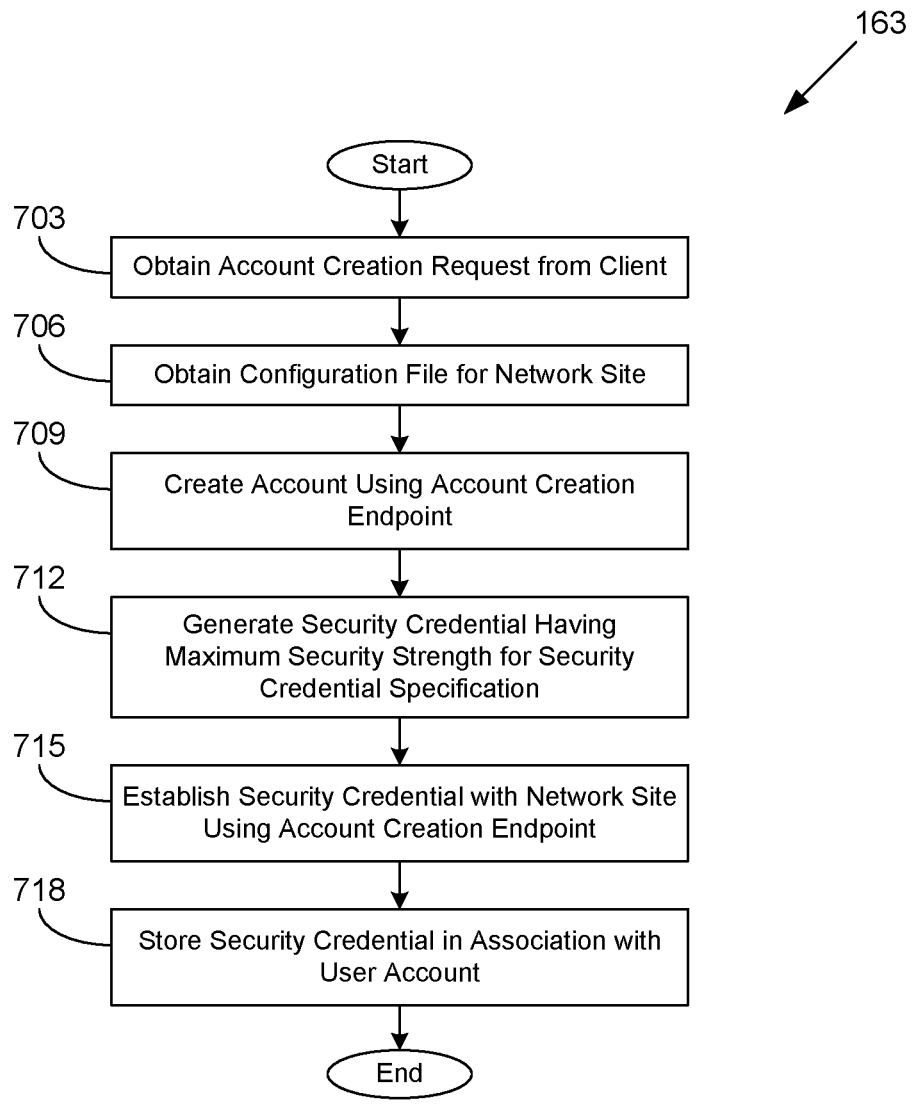

Moving on to FIG. 7, shown is a flowchart that provides one example of the operation of another portion of the security credential manager 163 according to various embodiments. It is understood that the flowchart of FIG. 7 provides merely an example of the many different types of functional arrangements that may be employed to implement the operation of the other portion of the security credential manager 163 as described herein. As an alternative, the flowchart of FIG. 7 may be viewed as depicting an example of steps of a method implemented in the computing device 112 (FIG. 1) according to one or more embodiments.

Beginning with box 703, the security credential manager 163 obtains an account creation request from a client 103 specifying that a user account is to be created for a network site 140 (FIG. 1). In various embodiments, it may be assumed that the client 103 is already authenticated according to the procedure of FIG. 6 or is in the process of establishing an account with the security credential manager 163. In box 706, the security credential manager 163 may obtain a configuration file 148 (FIG. 1) for the network site 140 (FIG. 1) from the network page server 136 (FIG. 1). The configuration file 148 may be stored as a configuration file 176 (FIG. 1). Alternatively, the configuration file 176 may be obtained from the configuration files 157 (FIG. 1) of a computing device 109 (FIG. 1).

In box 709, the security credential manager 163 creates a user account with the network site 140 using an account creation endpoint 138 (FIG. 1). In other embodiments, the security credential manager 163 may create the account using form filling. In still other embodiments, the account may be created in advance by the user, and the client 103 may supply the preexisting security credentials to access the account.

In box 712, the security credential manager 163 generates one or more security credentials for the account having the maximum security strength as defined by a security credential specification of the configuration file 176. For example, if 128 characters are permitted as a password length, and password characters may be selected from the entire Universal Character Set (UCS) Transformation Format-8 bit (UTF-8) character set, the security credential manager 163 may generate a 128-character password with characters randomly selected from the entire UTF-8 character set. In some cases, the security credentials may correspond to shared secrets. In other cases, the security credentials may be asymmetric, e.g., a public/private key pair or other form of public-key cryptography.

In box 715, the security credential manager 163 establishes the generated security credential with the network site 140 using the account creation endpoint 138. Alternatively, the security credential manager 163 may use form filling to establish the security credential. Additionally, the security credential manager 163 may change an existing security credential through the account creation endpoint to be the generated security credential. In such cases, the security credential manager 163 may supply the previous or existing security credential(s) to the account creation endpoint 138.

In box 718, the security credential manager 163 stores the security credential in association with the user account in the account data 160 (FIG. 1). The security credential may or may not be stored in an encrypted format. Thereafter, the portion of the security credential manager 163 ends.

Figure 8:
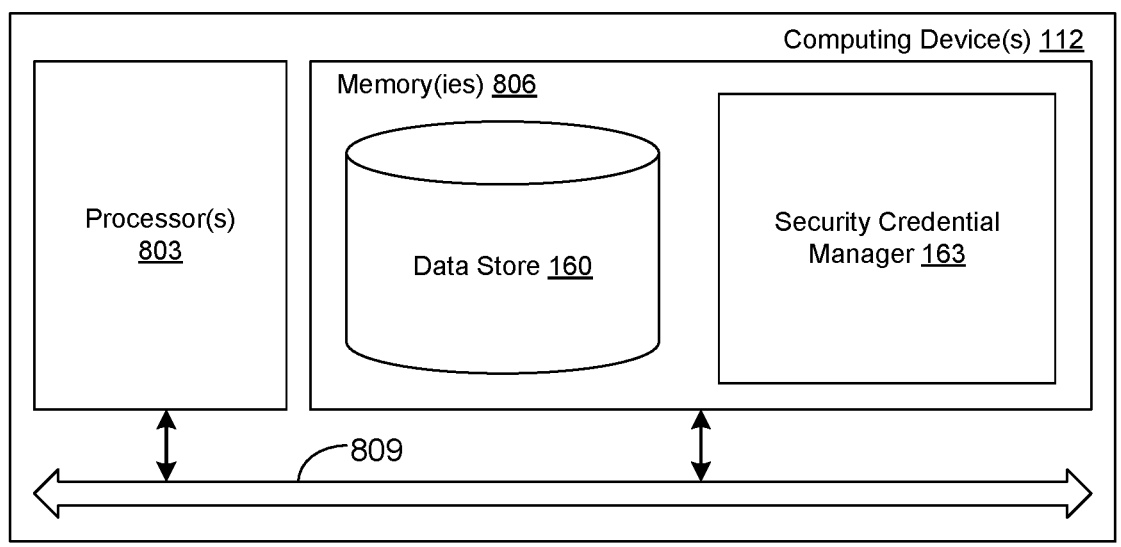
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 112 according to an embodiment of the present disclosure. Although the computing device 112 is discussed, it is understood that the computing devices 106, 109 and the client 103 may be similar. The computing device 112 includes at least one processor circuit, for example, having a processor 803 and a memory 806, both of which are coupled to a local interface 809. To this end, the computing device 112 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the security credential manager 163 and potentially other applications. Also stored in the memory 806 may be a data store 160 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the security credential manager 163, the authentication manager 124 (FIG. 1), the network page server 136 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-7 show the functionality and operation of an implementation of portions of the authentication manager 124 and the security credential manager 163. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 5-7 show a specific order of execution, it is understood that the order of execution may differ from that which is depicted. For example, the order of execution of two or more blocks may be scrambled relative to the order shown. Also, two or more blocks shown in succession in FIGS. 5-7 may be executed concurrently or with partial concurrence. Further, in some embodiments, one or more of the blocks shown in FIGS. 5-7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the security credential manager 163, the authentication manager 124, and the network page server 136, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, via at least one of one or more computing devices, a request to authenticate a user account, the request comprising a master security credential, a valid master security credential being employed to authenticate the user account for access to a plurality of security credentials;
   determining, via at least one of the one or more computing devices, that the master security credential is invalid;
   determining, via at least one of the one or more computing devices, to generate a plurality of dynamic knowledge-based questions instead of retrieving static knowledge-based questions, the determination being based at least in part on a sufficiency of user data associated with the user account;
   generating, via at least one of the one or more computing devices, the plurality of dynamic knowledge-based questions in an instance in which the master security credential is invalid;
   providing, via at least one of the one or more computing devices, the plurality of dynamic knowledge-based questions to an application executing on a client device;
   generating, via the at least one of the one or more computing devices, a score based at least in part on a comparison of a plurality of received answers to the plurality of dynamic knowledge-based questions with a plurality of valid answers to the plurality of dynamic knowledge-based questions, the plurality of received answers being received from the application; and
   in response to determining that the score meets or exceeds a predetermined threshold, granting, via the at least one of the one or more computing devices, access to reset a master security credential associated with the user account.

2. The method of claim 1, further comprising providing access to the plurality of security credentials for a predetermined number of minutes.

3. The method of claim 1, wherein providing the plurality of dynamic knowledge-based questions to the application comprises sending data to the application configured to generate a user interface to be rendered by the application, the user interface comprising the plurality of dynamic knowledge-based questions.

4. The method of claim 1, wherein the plurality of security credentials grant access for the user account to a plurality of different applications.

5. The method of claim 1, further comprising:
receiving a new master security credential from the application; and
storing a hashed version of the new master security credential as the master security credential.

6. The method of claim 1, further comprising sending a configuration file including a security credential specification to the client device, the security credential specification specifying at least one of: a character set, a minimum length, or a maximum length for a password.

7. The method of claim 1, wherein at least one of the plurality of dynamic knowledge-based questions is generated based at least in part on at least one of: purchase transaction data, browsing history, order history, search history, or profile information associated with the user account.

8. The method of claim 1, wherein individual received answers of the plurality of received answers are weighted with a respective different weight based at least in part on a respective knowledge-based question of the plurality of dynamic knowledge-based questions.

9. A system, comprising:
at least one computing device; and
a manager executable in the at least one computing device, wherein, when executed, the manager causes the at least one computing device to at least:
receive a request to authenticate a user account, the request comprising a master security credential, a valid master security credential being employed to authenticate the user account for access to account data associated with a user account;
determine to generate a plurality of dynamic knowledge-based questions instead of retrieving static knowledge-based questions, the determination being based at least in part on a sufficiency of user data associated with the user account;
generate the plurality of dynamic knowledge-based questions in an instance in which the master security credential is invalid;
generate a user interface comprising the plurality of dynamic knowledge-based questions;
receive a plurality of knowledge-based answers to the plurality of dynamic knowledge-based questions from a client device;
generate a score based at least in part on the plurality of received knowledge-based answers to the plurality of dynamic knowledge-based questions; and
in response to determining that the score meets or exceeds a predetermined threshold, perform an action comprising at least one of: establishing a new master security credential as the valid master security credential or providing access to the account data for a predetermined number of minutes.

10. The system of claim 9, wherein receiving the request comprises receiving a request to reset a master security credential associated with the user account.

11. The system of claim 9, wherein the account data comprises a plurality of security credentials accessible via the master security credential, and wherein, when executed, the manager causes the at least one computing device to at least provide the plurality of security credentials to the client device.

12. The system of claim 9, wherein the account data comprises a plurality of security credentials accessible via the master security credential, and wherein, when executed, the manager causes the at least one computing device to at least:
automatically generate at least one of the plurality of security credentials according to a security credential specification received from a remote computing device; and
send the at least one of the plurality of security credentials and the security credential specification to the client device.

13. The system of claim 9, wherein at least one of the plurality of dynamic knowledge-based questions is generated based at least in part on a recency of at least one of: purchase transaction data, browsing history, order history, search history, or profile information associated with the account data.

14. The system of claim 9, wherein the request comprises a master security credential, and receiving the request comprises determining that the master security credential is not valid based at least in part on comparing a hashed version of the master security credential with a master security credential stored in association with the user account.

15. A non-transitory computer-readable medium embodying specific instructions that, when executed, cause at least one computing device to at least:
receive a request for account data required to access a network site, the request being received from an application executing on a client device, and the request comprising a master security credential, a valid master security credential employed to authenticate a user account for access to the account data;
determine to generate a plurality of dynamic knowledge based questions instead of retrieving static knowledge-based questions, the determination being based at least in part on a sufficiency of user data associated with the user account;
generate the plurality of dynamic knowledge-based questions in an instance in which the master security credential is invalid;
provide the plurality of dynamic knowledge-based questions to the application;
generate a score based at least in part on a comparison of a plurality of received answers to the plurality of dynamic knowledge-based questions with a plurality of valid answers to the plurality of dynamic knowledge-based questions, the plurality of received answers being received from the application; and
in response to determining that the score meets or exceeds a predetermined threshold, perform an action comprising at least one of resetting the master security credential or providing the application with access to the account data for a predetermined number of minutes.

16. The non-transitory computer-readable medium of claim 15, wherein, when executed, the instructions further cause the at least one computing device to at least assign a different weight to individual answers of the plurality of received answers based at least in part on a recency of at least one of purchase transaction data or profile information associated with the account data.

17. The non-transitory computer-readable medium of claim 15, wherein the account data comprises at least one of a username, a password, a security key, or a certificate.

18. The non-transitory computer-readable medium of claim 15, wherein the instructions, when executed, further cause the at least one computing device to at least automatically generate at least one of a plurality of security credentials accessible via the master security credential according to a security credential specification received from a remote computing device.

19. The non-transitory computer-readable medium of claim 15, wherein the instructions, when executed, further cause the at least one computing device to at least deny access to the account data based at least in part on the score failing to meet a predetermined threshold.

20. The non-transitory computer-readable medium of claim 15, wherein providing the plurality of dynamic knowledge-based questions comprises at least one of: generating a network page for rendering in a browser in the client device or sending data to the application in order for a user interface to be rendered by the application.

* * * * *